(12) United States Patent
Yim et al.

(10) Patent No.: US 9,824,422 B2
(45) Date of Patent: Nov. 21, 2017

(54) OBJECTS IN SCREEN IMAGES

(71) Applicant: Samsung Electronics Co., Ltd., Gyeonggi-do (KR)

(72) Inventors: Saemee Yim, Gyeonggi-do (KR); Doosuk Kang, Gyeonggi-do (KR); Euichang Jung, Seoul (KR); Bokun Choi, Seoul (KR); Minkyung Hwang, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 657 days.

(21) Appl. No.: 14/242,145

(22) Filed: Apr. 1, 2014

(65) Prior Publication Data
US 2014/0306999 A1    Oct. 16, 2014

(30) Foreign Application Priority Data
Apr. 11, 2013   (KR) .................. 10-2013-0040062

(51) Int. Cl.
*G06T 3/40* (2006.01)
*G06T 11/00* (2006.01)
*G06T 11/60* (2006.01)
*G06K 9/72* (2006.01)
*G06K 9/00* (2006.01)

(52) U.S. Cl.
CPC ............... *G06T 3/40* (2013.01); *G06K 9/726* (2013.01); *G06T 11/00* (2013.01); *G06T 11/60* (2013.01); *G06K 9/00221* (2013.01); *G06K 9/00362* (2013.01)

(58) Field of Classification Search
CPC .......... G06T 3/40; G06T 11/00; G06T 11/60; G06K 9/726; G06K 9/00362; G06K 9/00221
USPC ........................................................ 345/635
See application file for complete search history.

(56) References Cited

U.S. PATENT DOCUMENTS

| | | | |
|---|---|---|---|
| 6,441,827 B1 | 8/2002 | Hori et al. | |
| 6,980,699 B1 | 12/2005 | Okada | |
| 7,519,907 B2 | 4/2009 | Cohen et al. | |
| 7,694,885 B1* | 4/2010 | Bourdev | G06F 17/30265 235/375 |
| 7,773,782 B2 | 8/2010 | Funakura | |
| 8,166,034 B2 | 4/2012 | Tsukagoshi et al. | |
| 8,203,745 B2 | 6/2012 | Hanechak | |
| 2001/0048447 A1 | 12/2001 | Jogo | |
| 2003/0076322 A1* | 4/2003 | Ouzts | G06F 3/0481 345/440 |
| 2009/0013268 A1 | 1/2009 | Amit | |

(Continued)

FOREIGN PATENT DOCUMENTS

EP   2 012 274 A2   1/2009
KR   10-2011-0067013 A   6/2011

*Primary Examiner* — Maurice L McDowell, Jr.
(74) *Attorney, Agent, or Firm* — Cha & Reiter, LLC

(57) ABSTRACT

A method for combining a plurality of images into a synthesis image and an electronic device implementing the same are provided. The image synthesis method of the present disclosure includes acquiring coordinates of an object in a source image; extracting a target image from the source image based on the coordinates such that the target image contains the object; and displaying the target image in a section of a frame mapped to the source image.

24 Claims, 21 Drawing Sheets

(56) References Cited

U.S. PATENT DOCUMENTS

| | | | | |
|---|---|---|---|---|
| 2009/0148064 A1* | 6/2009 | Schulz | ............... | G06T 3/4038 |
| | | | | 382/284 |
| 2009/0249177 A1* | 10/2009 | Yamaji | ............... | G06T 11/60 |
| | | | | 715/204 |
| 2013/0155069 A1* | 6/2013 | Borders | ............... | G06T 11/20 |
| | | | | 345/441 |
| 2015/0134492 A1* | 5/2015 | Harrison | ............ | G06F 3/04845 |
| | | | | 705/27.2 |

* cited by examiner

If [W1/H1 < W2/H2]
Wf:H2=W1:H2
Wf=(W1*H2)/H1

If [W1/H1 > W2/H2]
W1:H1=W2:Hf
Hf=(W2*H1)/W1

OBJECTS IN SCREEN IMAGES

CLAIM OF PRIORITY

This application claims the benefit under 35 U.S.C. §119 (a) of a Korean patent application filed on Apr. 11, 2013 in the Korean intellectual property office and assigned serial No. 10-2013-0040062, the entire disclosure of which is hereby incorporated by reference.

TECHNICAL FIELD

The present disclosure relates to an image synthesis method and, in particular, to a method for combining a plurality of images into a synthesis image and an electronic device implementing the same.

BACKGROUND

A portable electronic device such as smartphone is equipped with a function of processing images. For example, the electronic device has an image editing function capable of cutting, enlarging, and shrinking and image, and adjusting the contrast of the image. The electronic device provides a screen-frame composed of a plurality of sections. The electronic device is capable of extracting a part of the image which matches the corresponding section. The electronic device is capable of positioning the image obtained by matching partial images to the corresponding sections of the frame as a synthesis image. However, certain objects (e.g. a face) may be missing in the corresponding section or included partially.

SUMMARY

The present disclosure aims to provide an image synthesis method and device capable of positing an object to the desired section of the frame. In accordance with an aspect of the present disclosure, an image synthesis method is provided. The image synthesis method may include selecting source images; acquiring coordinates of an object in the source image, the coordinates being contained in tag information associated with the source image; extracting a target image from the source image based on the coordinates such that the target image includes the object; and displaying the target image in a section within a screen frame, the section being mapped to the source image.

In accordance with another aspect of the present disclosure, an image synthesis method may include selecting source images included in an image folder; acquiring coordinates of objects in the source images, the coordinates being contained in tag information associated with the source images; extracting target images from the source images based on the coordinates, such that each of the extracted target images contains an object; and displaying each target image in a corresponding section of a magazine screen view representing a cover of the image folder.

In accordance with a further aspect of the present disclosure, an image synthesis method may include detecting selection of source images; displaying thumbnail images representing respectively frames, each of the frames having sections and the number of the sections being equal to the number of the selected source images; detecting selection of one of the thumbnail images; acquiring position informations of objects in tag informations tagged respectively to the selected source images; extracting target images including the objects from the selected source images based on the position informations; and displaying the target images in the sections of the frame that correspond to the selected thumbnail image.

In accordance with yet another aspect of the present disclosure, an electronic device is provided. The electronic device may include a display unit; a touch panel mounted on a screen of the display unit; a storage unit which stores images and tag information associated with the images; a control unit configured to: detect selection of a source image on the touch panel, access the tag information in the storage unit to acquire coordinates of an object in the selected source image; extract a target image from the selected source image based on the coordinates, such that the target image contains the object; and control the display unit to display the target image in one screen frame section mapped to the selected source image.

In accordance with another aspect of the present disclosure, an electronic device is provided. The electronic device may include a display unit; a storage unit to store images and tag information tagged to the images; a control unit configured to: select source images among images included in an image folder; acquire coordinates of objects in the source images, the coordinates being contained in tag information associated with the source images; extract target images from the source images based on the coordinates, such that each image contains an object; and control the display unit to display each target image in a corresponding section of a magazine screen view representing a cover of the image folder.

In accordance with still another aspect of the present disclosure, an electronic device is provided. The electronic device may include a display unit; a touch panel mounted on a screen of the display unit; and a control unit configured to: detect selection of source images on the touch panel; control the display unit to display thumbnail images representing respectively frames, each of the frames has sections and the number of the sections is equal to the number of the selected source images; detect selection of one of the thumbnail images on the touch panel; acquire position informations of objects in tag informations tagged respectively to the selected source images; extract target images including the objects from the selected source images based on the position informations; and control the display unit to display the target images in the sections of the frame that correspond to the selected thumbnail image.

DETAILED DESCRIPTION

Figure 1A:
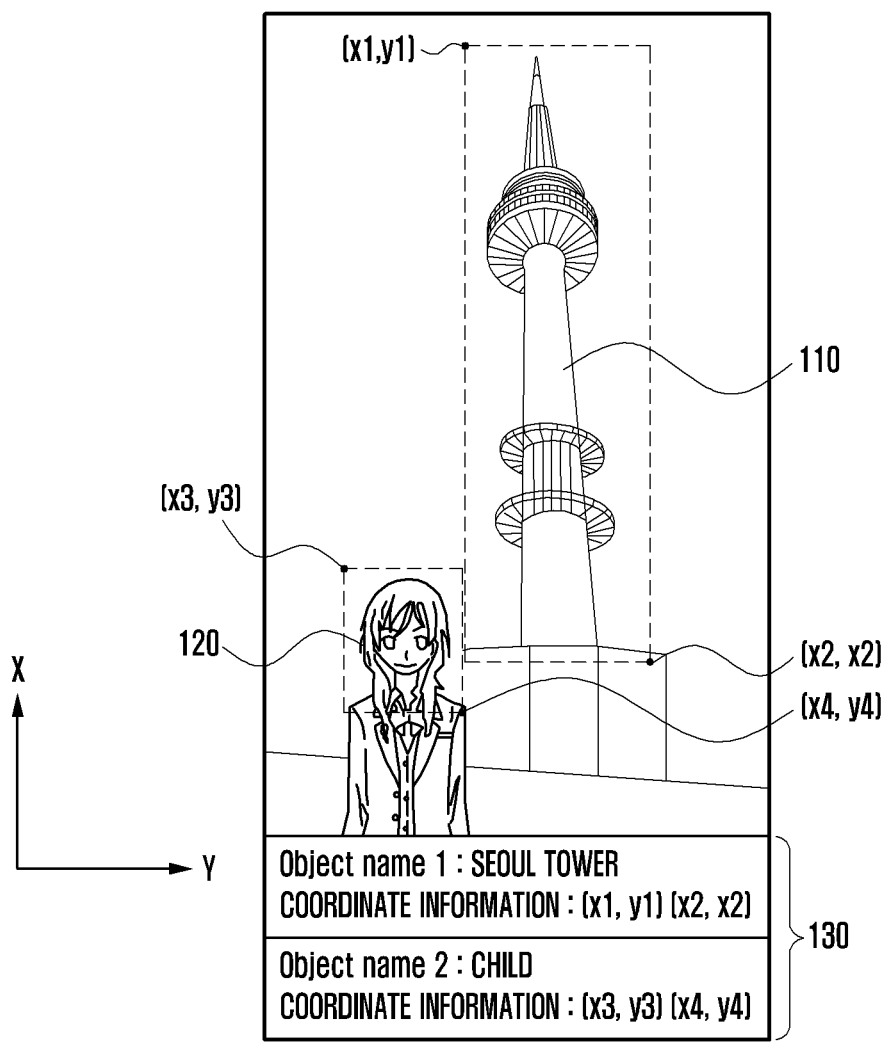
FIG. 1A and FIG. 1B are diagrams of example screen displays for explaining a procedure of generating tag information in the image synthesis method in accordance with aspects of the present disclosure.

A description is made of the image synthesis method and device of the present disclosure in detail. Examples of the present disclosure are described with reference to the accompanying drawings in detail. The terms and words used in this description and the appended claims are not to be interpreted in common or lexical meaning but, based on the principle that an inventor can adequately define the meanings of terms to best describe the disclosure, to be interpreted in the meaning and concept conforming to the technical concept of the present disclosure. Thus, it should be understood that there may be various equivalents and modified examples that can replace the examples described in the present specification and the configuration shown in the drawings at the time of filing the present application. In the drawings, certain elements may be exaggerated or omitted or schematically depicted for clarity of the disclosure, and the actual sizes of the elements are not reflected. Thus, the present disclosure is not limited in the relative sizes of the elements and distances therebetween. Detailed description of well-known functions and structures incorporated herein may be omitted to avoid obscuring the subject matter of the present disclosure.

In the present disclosure, the electronic device may be any of smartphone, tablet Personal Computer (PC), laptop PC, digital camera, Personal Digital Assistant (PDA), electronic organizer, desktop PC, Portable Multimedia Player (PMP), media player (e.g. MP3 player), portable game console, and electric appliance having a display (e.g. refrigerator, TV, and laundry machine).

In the present disclosure, the source image may be the image to be processed. The file format of the source image may be may be Tagged Image File format (TIFF) or Joint Photographic Experts Group (JPEG). In the present disclosure, the target image may be the image placed in a section of the frame. The target image may be a part of the source image. In another example, the source image may become the target image. Particularly, the target image may include an object (e.g. person or thing). Here, the term 'frame' may be referred to as a magazine view, cover, tile view, or polygonal decoration frame. In the case that the corresponding synthesis image may be used as the image representing an image folder, the frame may be referred to as magazine view or cover.

The electronic device of the present disclosure may use tag information in order to extract the target image that also includes an object from the source image. The tag information may indicate supplementary information of the image, and the image file format may be Exchangeable image file format (Exif). For example, the tag information may include position of object (e.g. XY coordinates of a corner) and object identity information (e.g. person's name, address, and phone number, and object name). The tag information also may include the manufacturer of the camera that shot the image, camera model, image editor software information, photo modification date (Datetime), Exif version, shot date, contrast, resolution, actual size of image loaded on web, exposure time (shutter speed), exposure program, focal length, diaphragm opening value (F-Number), location information (e.g. GPS information), and whether flash is used or not.

The electronic device of the present disclosure may tag various information associated with the image using various image recognition techniques. That is, the electronic device may generate the tag information in association with the image. The tag information may be generated in the following way.

The electronic device may recognize or detect the object in the image. Here, the image may be the image stored in the electronic device, taken by means of the camera, downloaded from an external device (e.g. web server) through a network, or synthesized by combing a plurality of images. For example, the electronic device may start detecting an object in response to a shutter event of the camera. The electronic device may start detecting an object in response to receiving an image from outside. The object recognition may be performed using recognition techniques. The person recognition may be performed with various techniques using face, half body, whole body, and posture. The person recognition methods may use the phonebook and social network applications. For example, the photos registered with the phonebook and social network application may be used for face recognition. The object recognition may use various techniques based on location information such as Global Positioning System (GPS) information and map information.

The electronic device may generate location information of the object. The location information may include information regarding the position of the object in the corresponding image. The electronic device may tag the location information to the image. The tag information may be stored along with the corresponding image integrally or separately.

Figure 1B:
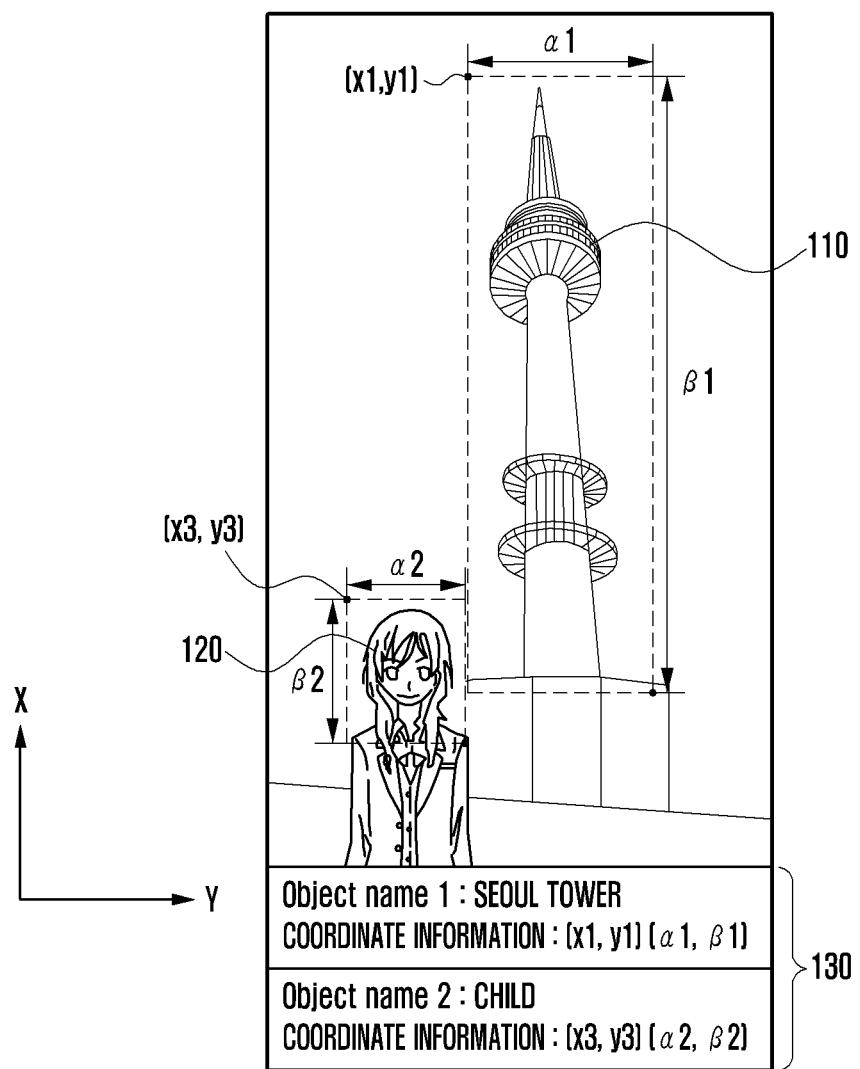

FIGS. 1A and 1B are diagrams illustrating example screen displays for explaining a procedure of generating tag information in the image synthesis method in accordance with aspects of the present disclosure.

Referring to FIGS. 1A and 1B, the electronic device detect or recognizes the objects included in the image. For example, the electronic device recognizes two objects 110 and 120 in the image. If the two objects 110 and 120 are recognized, the electronic device generates position information 130 of the respective objects 110 and 120.

The position information may include the top left corner coordinates and bottom right corner coordinates of a rectangle surrounding each object. For example, the top left corner coordinates of the first object 110 are (x1, y1), and the top left corner coordinates of the second object 120 are (x3, y3). The bottom right coordinates of the first object are (x2, y2), and the bottom right coordinates of the second object 12 are (x4, y4).

In another example, the position information of an object may include the coordinates of one corner of the rectangle surrounding the object and lengths of the horizontal side (x axis) and vertical side (y axis) starting at the corner as shown in FIG. 1B. For example, the position information of the first object 110 includes the coordinates (x1, y1) of a corner of the rectangle of surrounding the first object 110 and the horizontal and vertical lengths α1 and β1. Likewise, the position information of the second object 120 may include the coordinates (x3, y3) and the vertical and horizontal lengths α2 and β2. The position information is not limited to the foregoing description. For example, the position information may include coordinates on the boundary of the corresponding object and the background.

Once the position information associated with objects 110 and 120 are determined, the electronic device may tag the position information to the image. The electronic device may generate the names of the objects 110 and 120 and may associate the tag information to the corresponding image using a recognition method. The electronic device may tag various information in the corresponding image in addition to the position information and names of the objects.

Figure 2:
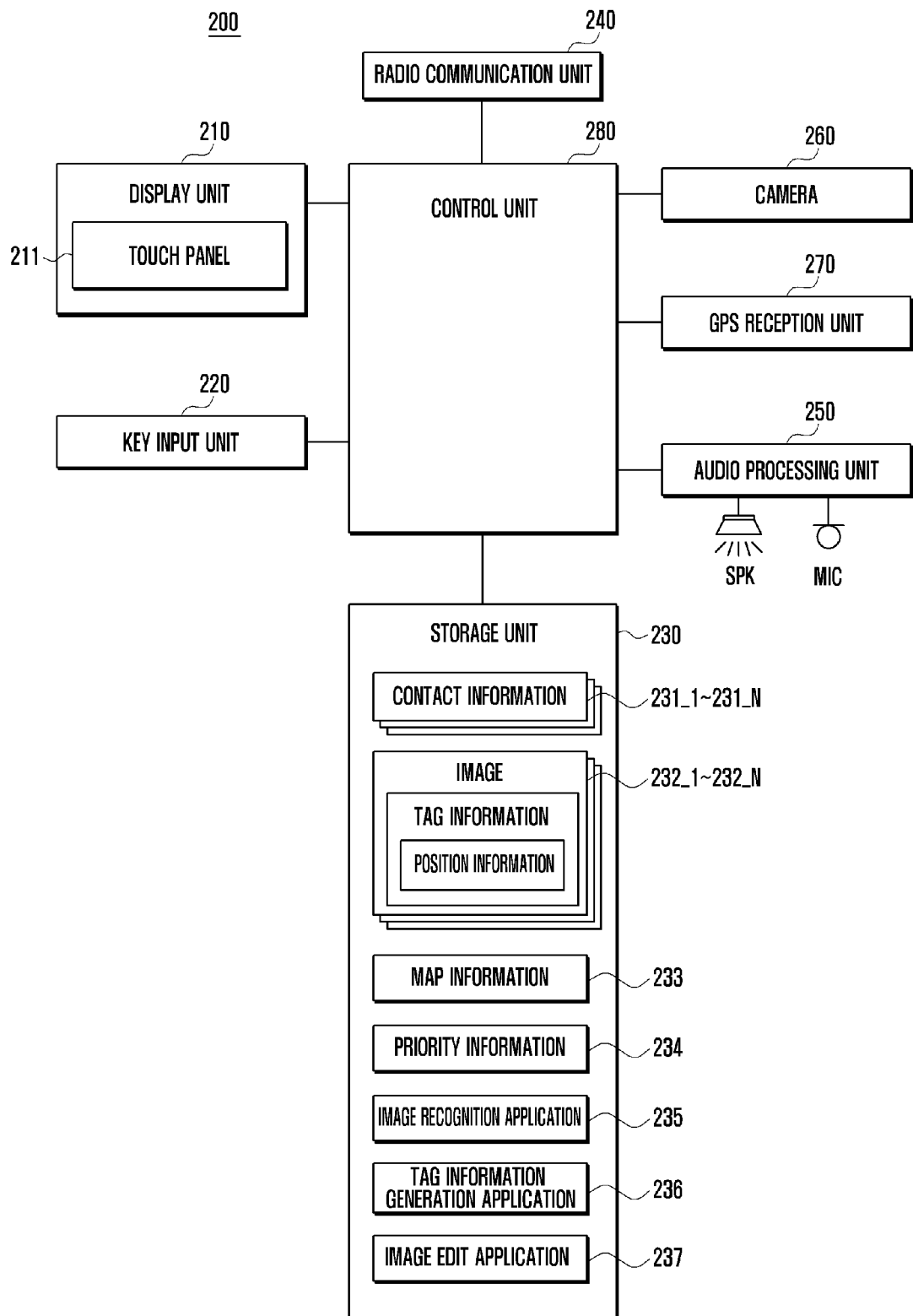
FIG. 2 is a block diagram illustrating an example configuration of the mobile terminal in accordance with aspects of the present disclosure.

FIG. 2 is a block diagram illustrating a configuration of the mobile terminal in accordance with aspects of the present disclosure.

As shown in the example of FIG. 2, the mobile terminal 200 may include a display unit 210, a key input unit 220, a storage unit 230, a radio communication unit 240, an audio processing unit 250, a speaker (SPK), a microphone (MIC), a camera 260, a GPS reception unit 270, and a control unit 280.

The display unit 210 may display data (e.g. image) on the screen under the control of the control unit 280. That is, if the control unit 280 processes (e.g. decodes) data and writes the processed data in a buffer, the display unit 210 converts the buffered data to analog signal for display on the screen. If the display unit 210 powers on, it displays a lock image on the screen. If an unlock signal is detected in the state that the lock image is displayed, the control unit 280 unlocks the screen. The display unit 210 displays a home image instead of the lock image under the control of the control unit 280. The home image may include a background image (e.g. a photo configured by the user) and a plurality of icons arranged on the background image. The icons may represent corresponding applications and contents (e.g. photo, video, speech file, document, and message). If the user selects one of the icons, the control unit may execute the corresponding application. Here, the home image may be referred to as home screen. The lock image may be referred to as lock screen.

The display unit 210 may receive the execution image of an application from the control unit 280 and may convert the execution image to analog signal for display.

The display unit 210 may display the images in multi-layer structure under the control of the control unit 280. For example, the display unit may display a photo on the screen and tag information thereon.

The display unit 210 may be implemented one of Liquid Crystal Display (LCD), Active Matrix Organic Light Emitted Diodes (AMOLED), flexible display, and transparent display.

The touch panel 211 may be placed on the display panel of display unit 210. In detail, the touch panel may be implemented in add-on type in which the touch panel is placed on the display panel or in on-cell type or in-cell type in which the touch panel is embedded into display panel.

The touch panel 211 may generate an analog input signal (e.g. touch event) in response to the user's gesture made on the touch panel 211, the touch IC of the touch panel 211 may perform Analog/Digital (A/D) conversion on the analog signal to generate a digital signal to the control unit 280. Here, the input signal may include the touch coordinates (x, y). For example, the touch IC determines representative coordinates among plural touch coordinates and transfers the representative touch coordinates to the control unit 280. This control operation may be performed by the control unit 280. The touch coordinates may be the pixel coordinates. For example, if the screen resolution is 640 (number of pixels in horizontal direction)*480 (number of pixels in vertical direction), the X axis coordinate is (0, 640) and the Y axis coordinate is (0, 480). If the touch coordinates are received from the touch IC the control unit 280 determines that a touch gesture has made on the touch panel 211 with a touch input tool (e.g. finger and pen) and, if the touch coordinates are received no longer, the touch of the touch input tool has been released. If the coordinates are changed, e.g. from (x0, y0) to (x1, y1), and the displacement (e.g., $D(D^2 = (x0-x1)^2 + (y0-y1)^2)$) is greater than a movement threshold (e.g. 1 millimeter), the control unit 280 determines that the touch input tool has moved. If the movement of the touch input tool is detected, the control unit 280 calculates the touch displacement (dx, dy) and movement speed of the touch input tool. The control unit 280 can differentiate among user's touch gestures of single touch, multi-touch, tap, double tap, long tap, tap & touch, drag, flick, press, pinch in, and pinch out, based on the touch coordinates, touch release, tough movement, touch displacement, touch speed, etc.

The 'touch' may be a user's gesture contacting a touch tool at a position on the touchscreen, the 'multi-touch' is the gesture of contacting the touch tool at least to positions (e.g. with thumb and index finger) on the touch screen, the 'tap' may be the gesture of contacting a position on the screen with a touch tool and releasing the contact (touch-off) without moving the touch tool, the 'double tap' may be the gesture of making the tap twice, the 'long tap' may be the gesture of maintaining the contact for a long time as compared to the tap and then releasing the contact, the 'tap and touch' may be the gesture of making a tap to a certain position and then making a touch at the same position in a predetermined time (e.g. 0.5 second), the 'drag' may be the gesture of contacting a position and moving the contact on the screen in a certain direction, the 'flick' may be a user's gesture of snapping on the screen quickly as compared to the drag gesture, the 'press' may be a user's gesture of contacting at a certain position on the screen and applying press, the 'pinch-in' may be the gesture of making two contact points with two touch tools and narrowing the distance between the two contact points, and the 'pinch-out' may be the gesture of widening the distance between two contact points. That is, the 'touch' may be the state of contacting the touch panel, and other gestures may be changes in touched state.

The touch panel 211 may be an integrated touch panel including a hand touch panel for detecting a hand gesture and a pen touch panel for detecting a pen gesture. Here, the hand touch panel is implemented in capacitive type. Of course, the hand touch panel can be implemented in resistive type, infrared type, or microwave type. The hand touch panel is capable of detecting the touch event made by means of an object (e.g. a conductive material object capable of influencing the electric capacitance) as well as the touch even made by means of hand gesture of the user. The pen touch panel can be implemented in electromagnetic induction type. In this case, the pen touch panel generates a touch signal in response to the touch gesture made by means of a stylus pen manufactured to form a magnetic field.

Particularly, the touch signal may include a value indicating a kind of the touch as well as touch coordinates. For example, if a first power level value is received from the pen touch panel, the control unit 280 may determine the touch made by the touch input tool as an indirect touch (so-called hovering). If a second power level value, which is greater than the first power level value, is received from the pen touch panel, the control unit 280 may determine the touch made by the touch input tool as a direct touch. The touch signal generated by the pen touch panel may further include a value indication whether a key of the pen is pushed. If the key of the pen is pushed, the electromagnetic field generated by the coil of the pen may be changed such that the pen touch panel generates a third power level value to the control unit 280.

The key input unit 220 may include at least one touch key. The touch key may be implemented in the capacitive type or the resistive type to detect a touch made by the user. The touch key generates a signal to the control unit 280 in response to the user's touch. The touch key may be installed close to the screen (e.g. below the screen). For example, the control unit 280 may control the display unit 210 to display a menu at the bottom side of the screen in response to the signal generated by the first touch key (menu key). The control unit 280 may also control the display unit 210 to display the previous image in response to the signal generated by a second touch key (undo key). For example, if the second touch key generates the signal in the state that the tag information is presented on a photo, the tag information disappears.

The key input unit 220 may further include other types of keys than the touch keys. For example, the key input unit 220 may include at least one dome key. If the user pushes the dome key, it is changes in shape to contact the printed circuit board such that a key signal is generated to the control unit 280. Such a dome key may be installed on one side of the mobile terminal 200 or near the screen (e.g. below the screen). The key singles may include power on/off signal, volume control signal, screen on/off signal, and shutter signal. The control unit 280 controls the above described components in response to the key signal. The keys provided by the key input unit 220 may be called hard keys, and the virtual keys provided by the display unit 210 may be called soft keys.

The storage unit 230 may include Random Access Memory (RAM), Read Only Memory (ROM), and flash memory. The storage unit 230 stores the data generated by the mobile terminal 200 and received from an external device (e.g. server, desktop PC, and tablet PC). For example, the storage unit 230 may store the contact information 231_1 to 231_N, images 232_1 to 232_N, map 233, and priority information 234. Each of the contact information 231_1 to 231_N may include name, address, email address, profile photo, hobby, relationship with user (e.g. friend, family, and company), phone number, etc. Each of the images 232_1 to 232_N may include the tag information. Particularly, the tag information may include object position information. As described above, the tag information may include various information.

The storage unit 230 may store the data (such as message, photo, webpage, and document) copied by the user temporarily for copy & paste. The storage unit 230 also may store various configuration values (e.g. screen brightness, vibration responsive to touch, auto-display mode switching) associated with the operation of the mobile terminal 200.

The storage unit 230 stores a booting program, at least one Operating System (OS), and applications. The OS is responsible for providing interface between hardware and applications and among the applications and manages the computer resources such as CPU, GPU, main memory, and storage unit 230. The applications may be sorted into embedded application and the $3^{rd}$ party application. For example, the embedded application may include a web browser, an email application, an instant messenger, etc. Particularly, the storage unit 230 may store the image recognition application 235, a tag information generation application 236, and an image edit application 237.

The radio communication unit 240 may be responsible for voice, video, and data communication with another terminal through a network under the control of the control unit 280. The radio communication unit 240 includes an RF transmitter for frequency up-converting and amplifying the signal to be transmitted and an RF receiver for low noise amplifying and down converting the received signal. The radio communication unit 240 includes at least one of a cellular communication module (e.g. $3^{rd}$, $3.5^{th}$, and $4^{th}$ Generation mobile communication modules), a digital broadcast module (e.g. DMB module), and a short range communication module (e.g. Wi-Fi module, Bluetooth module, and Near Field Communication (NFC) module).

The audio processing unit 250 may perform speech recognition, voice recording, and audio signal (e.g. voice) input and output for digital recording and call processing in cooperation with a speaker (SPK) and a microphone (MIC). The audio processing unit 250 may convert the analog audio signal input through the microphone (MIC) to the digital audio signal and may send the digital audio signal to the control unit 280. The speaker (SPK) may convert the audio signal from the audio processing unit 250 to an audible sound wave. The microphone (MIC) may convert the sound wave of human voice or output from a sound source to the audio signal.

The camera 260 may take an image of a scene and send the image to the control unit 280. The camera 260 may include a lens for collecting light, an image sensor for converting the collected light to an electronic signal, and an Image Signal Processor (ISP) for processing the electronic signal to generate raw data to the control unit 280. Here, the ISP processes the raw data to generate a preview image to the control unit 280. Then the control unit 280 controls the display unit 210 to display the preview image on the screen. The ISP also processes the raw data to generate a compressed image (e.g. JPEG image) to the control unit 280. The control unit 280 detects a shutter-on signal input by means of the touch panel 211 or the key input unit 220 (tap on a shutter button presented by the display unit 210) and stores the compressed image in the storage unit 230 in response to the shutter-on signal. The ISP may be included in the control unit 280, e.g. AP, other than the camera 260. The mobile terminal 200 of the present disclosure may be provided with a dual camera system. For example, the dual camera system may include a rear camera installed on the rear side of the mobile terminal and a front camera installed on the front side of the mobile terminal. Of course, the two cameras may be installed on the same side.

The GPS reception unit 270 may receive GPS signal including transmission time that is transmitted by at least three GPS satellites, calculates the distances between GPS reception unit 270 (i.e. mobile terminal 200) and the satellites, calculates the location, i.e. 2-dimensional coordinates (latitude and longitude), using the distance information, and transfers the location information to the control unit 280 under the control of the control unit 280. This calculation may be performed by the control unit 280, i.e. the AP.

The control unit 280 may control overall operation and signal flows among the internal components of the mobile terminal 200, data processing, and power supply from the battery to the internal components.

The control unit 280 may include at least one Central Processing Unit (CPUs). The CPU may be the main control unit of a computer system for performing operation and comparison on data and interpreting and executing commands. The CPU may include a plurality of registers storing data and commands temporarily. The control unit 280 may include one or more Graphic Processing Units (GPUs). The GPU is the graphic control unit for performing operation and comparison on the graphic data and interpreting and executing commands related to the graphic data instead of the CPU. Each of the CPU and GPU may be manufactured as a package of two or more independent cores (e.g. quad-core). The CPU and GPU may be integrated in the form of System on Chip (SoC). The CPU and GPU also may be multilayer-packaged. An Application Process may include the CPU and GPU. The AP may further include ISP.

The control unit 280 may include a main memory unit, e.g. RAM. The main memory may store various programs, e.g. booting program, OS, and applications, loaded from the storage unit 230. The mobile terminal powers on, the booting program may be loaded on the main memory unit of the control unit 280. The booting program may load the OS on the main memory. The OS may load the application on the main memory. The control unit 280 (e.g. AP, and CPU) may access the program stored in the main memory, analyze the command of the program, and execute a function (e.g. person recognition, object recognition, tag information generation, and image edit) according to the analysis result. The control unit 280 may include a cache memory for storing the data to be written in or read from the storage unit 230 temporarily.

The control unit 280 may use the contact information and map information for generating the tag information. For example, if a mountain is recognized as an object, the control unit 280 may check the name of the mountain based on the GPS information and the map information and may tag the name to the corresponding object image. If a face is recognized as an object, the control unit 280 may compare the recognized face with profile photos to check the name of the person identified with the face and may tag the name to the corresponding object image.

The control unit 280 may use the tag information and priority information 234 for selecting the target to be edited among the images 232_1 to 232_N. In the case that the theme of the image synthesis (e.g. name of image folder) is 'mountain', the control unit 280 checks the tag information of the images 232_1 to 232_N, and selects the images related to mountain. Next, the control unit 280 picks the editing target images among the selected images by referencing the priority information 234. Assuming that the priority information 234 is provided as shown in table 1, the control unit 280 selects the images whose object names are associated with the theme, when it is determined that the theme is a high priority. If a large number of images are selected (e.g. the number of selected images is greater than that of the sections), the control unit 280 may pick a number of target images equal to the number of sections in the frame. If the number of selected images is less than that of the sections, the control unit 280 may further select the images among the images excluded at the first selection phase such that the most recently taken images are given highest priority.

TABLE 1

| | |
|---|---|
| Priority 1 | Image having object of which identity information (e.g. name) is associated with the theme (e.g. name of image folder) |
| Priority 2 | Image taken recently |
| Priority 3 | Image of which contrast is bright |
| Priority 4 | Image with high resolution |

The control unit 280 may combine the images into a synthesis image. The image synthesis procedure is described below.

The mobile terminal 200 may further include an ear-jack, a vibration motor, an acceleration sensor, and accessories. The accessories may include a detachable part of the mobile terminal 200 such as stylus pen.

Figure 3:
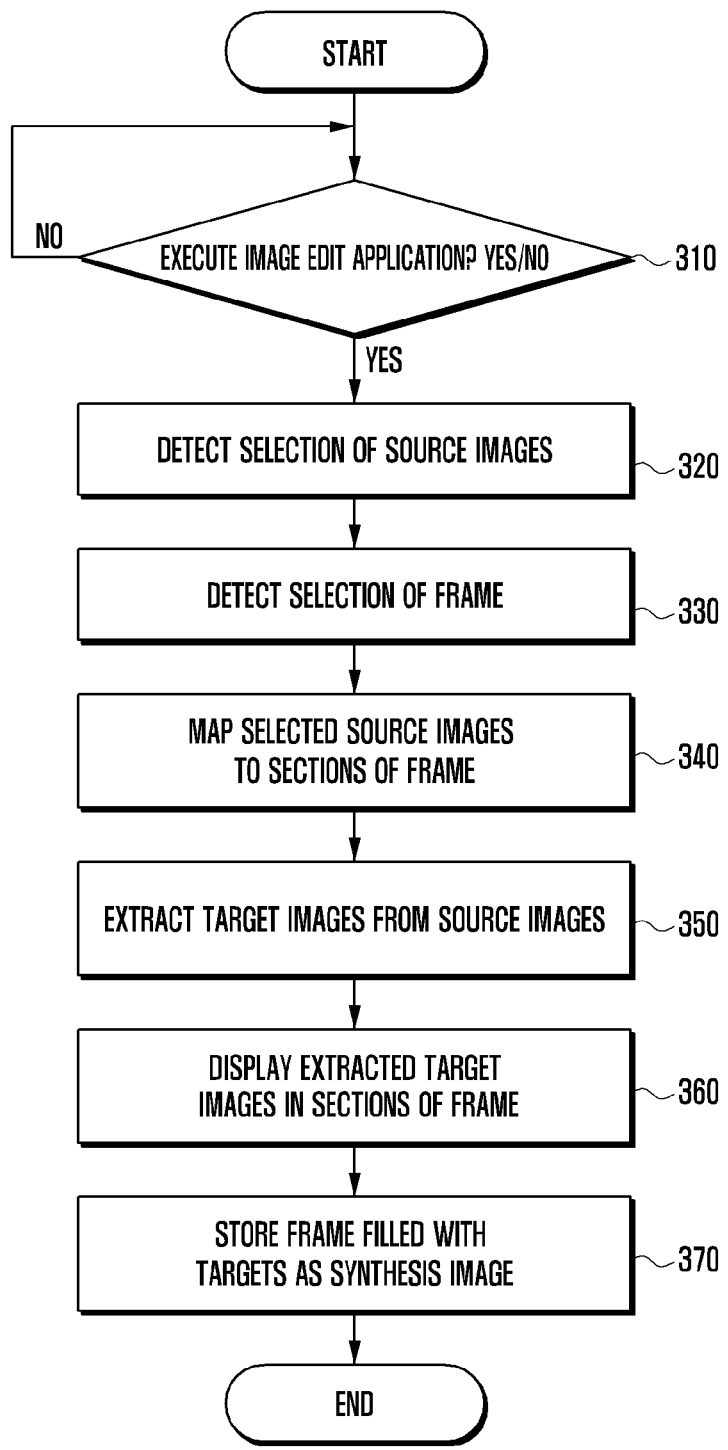
FIG. 3 is a flowchart illustrating an example image synthesis method in accordance with aspects of the present disclosure.

FIG. 3 is a flowchart illustrating an image synthesis method in accordance with aspects of the present disclosure. Referring to FIG. 3, the control unit 280 may determine whether a gesture that requests execution of an image edit application 237 (e.g. tap on an icon corresponding to the application) is detected, at block 310. If the execution request signal is received, the control unit 280 controls the display unit 210 to display the execution image of the image edit application.

Figure 4:
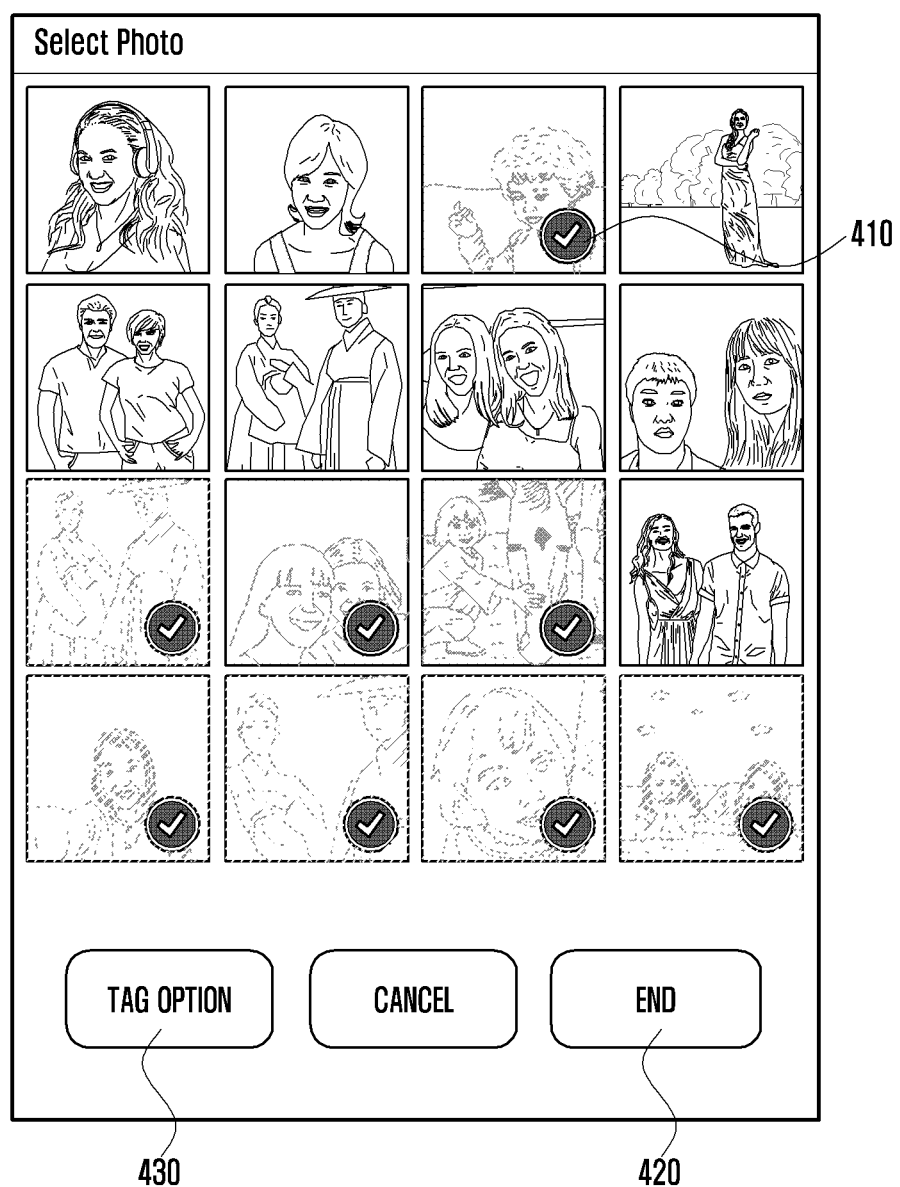
FIG. 4 is a diagram illustrating an example screen display for explaining an image selection procedure of the image synthesis method of FIG. 3.

The control unit 280 may detect a gesture of selecting source images on the touch panel 211 at block 320 and may detect selection of a frame at block 330. Referring to FIG. 4, the display unit 210 displays the thumbnail images corresponding to the source images under the control of the control unit 280 as shown in FIG. 4. If the thumbnail images are selected (tapped) by the user, the control unit 280 may control the display unit 210 to present identifiers on the respective thumbnail images, such that the selected thumbnail images are distinguished from the non-selected thumbnail images (e.g. by dimming the selected thumbnail images). Thumbnail 410 is one example of a selected thumbnail.

Figure 5A:
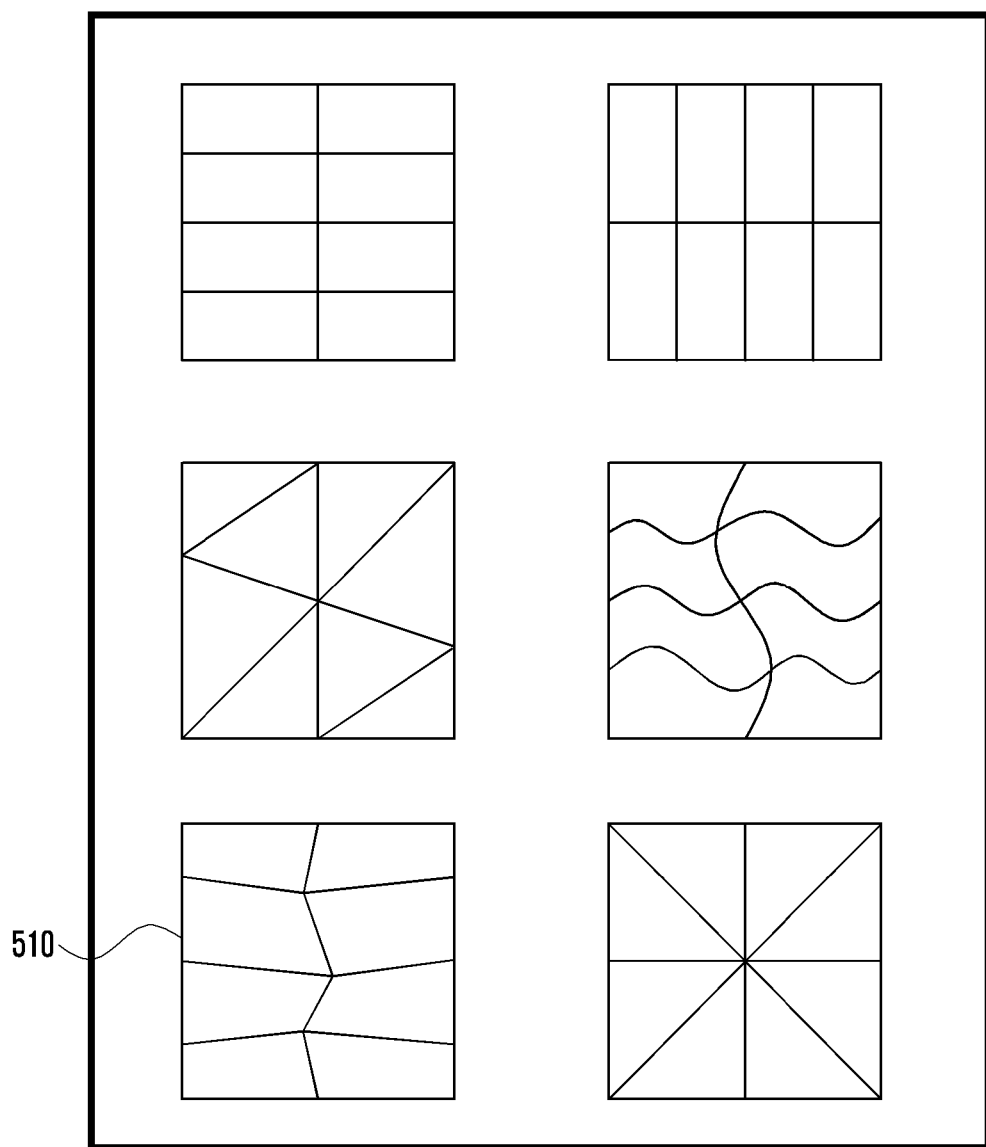
FIG. 5A is a diagram illustrating an example screen display for explaining a procedure of selecting a frame in the image synthesis method of FIG. 3.

If a tap is detected on the selection complete button 420, the control unit 280 may control the display unit 210 to display the selected thumbnail images in the corresponding sections of the frame. At this time, the number of sections may be equal to the number of selected source images. For example, if the selected source images are 8, these images are displayed in the 8 sections of the frame respectively as shown in FIG. 5A. FIG. 5A show thumbnail images representing respectively different frames. Each of the frames has different 8 section patterns. However, it is understood, that a frame may be split into 9 or more sections for presenting the same number of images. If the source images are selected, the control unit 280 may access the tag information of the source images to acquire the total number of objects therein. If there are 8 source images, one having two objects and the others having one object, the control unit 280 may acquire 9 objects. Then the display unit 210 may prepare the frame split into 9 sections for presenting the 9 thumbnail images.

If the number of objects is not acquired based on the tag information, the control unit 280 may detect the number of objects in the corresponding source images using an image recognition technique. Here, the number of objects is a value recognized by the control unit 280. By way of example, if several people are gathered closely in the photo, the control unit 280 may recognize the people as one object, or it is also possible for the control unit 280 to identify each individual person separately. In this case, each person may be recognized as an independent object.

Figure 5B:
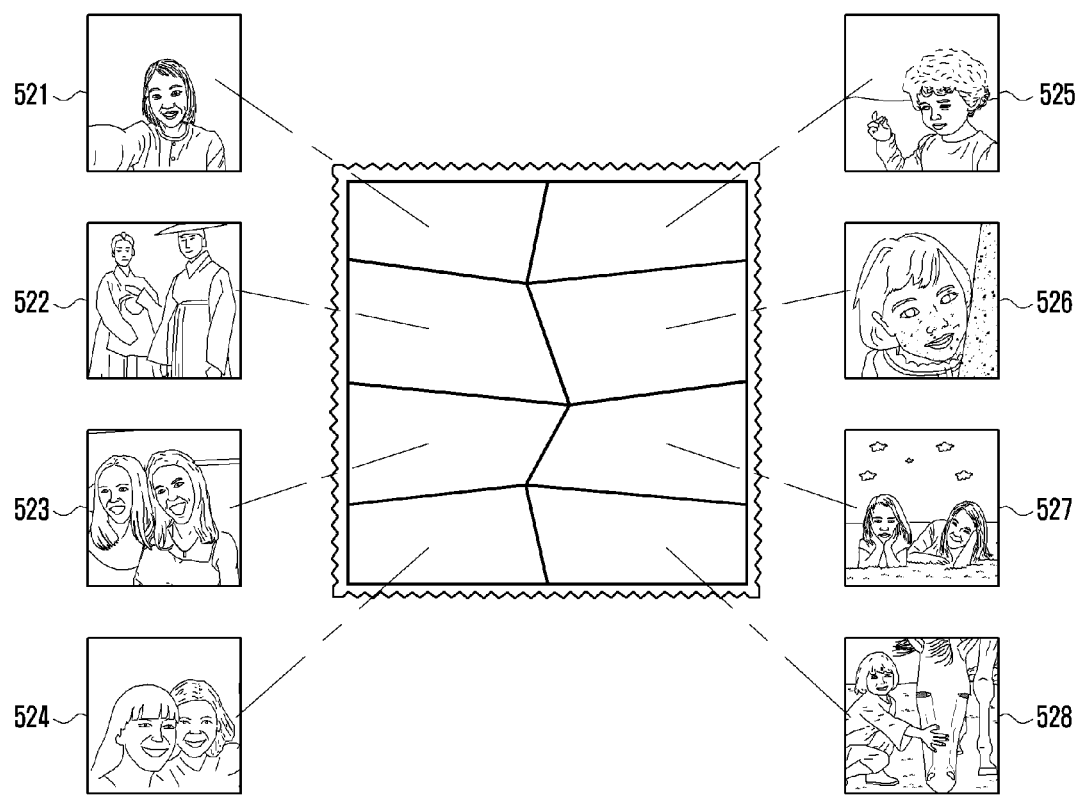
FIG. 5B is a diagram illustrating an example procedure of mapping images to the sections of a selected frame in the image synthesis method of FIG. 3.
Figure 5C:
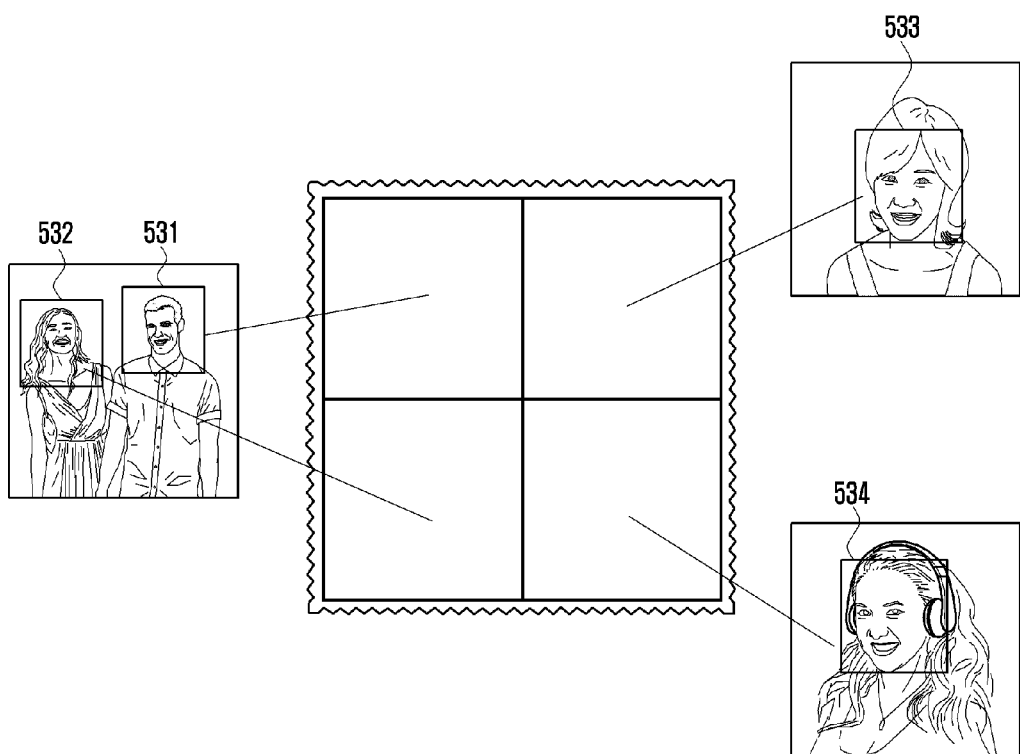
FIG. 5C is a diagram illustrating an example procedure of mapping images to the selections of another selected frame in the image synthesis method of FIG. 3.

If a frame having different section patterns is selected (e.g., if the user touches a thumbnail image 510), the control unit 280 may map the selected original images (521 to 528) to the respective sections of the selected frame, as shown in FIG. 5B. The control unit 280 may map the detected objects 531 thru 534 to the sections of the frame one by one at block 340, as shown in FIG. 5C. Here, the mapping may be performed in various ways. For example, the control unit 280 may map the objects and the sections randomly. The control unit 280 may also map the objects and the sections in view of the sizes of the objects and sections. For example, the control unit 280 may calculate the sizes of the objects and sections. The control unit 280 may map the largest object to the largest section. That is, the order of the mapping may be performed in accordance with the size of each object.

Figure 5D:
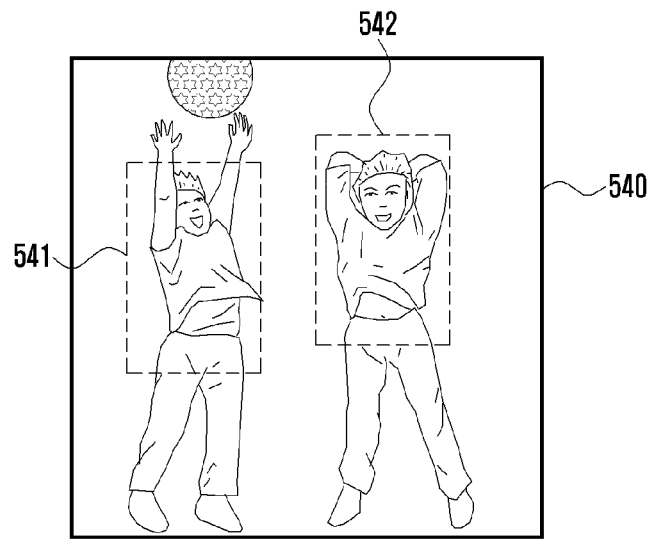
FIG. 5D is a diagram illustrating an example screen display for explaining a procedure of extracting target images in the image synthesis method of FIG. 3.
Figure 5E:
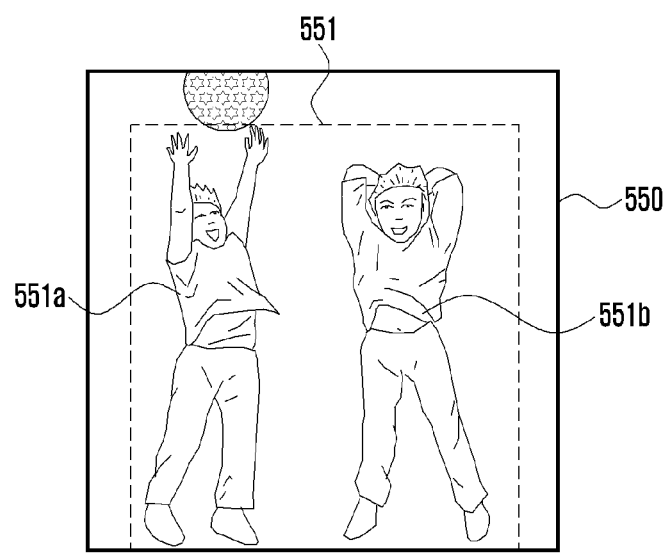
FIG. 5E is a diagram illustrating an example screen display for explaining another procedure of extracting target image in the image synthesis method of FIG. 3.

The control unit 280 may extract the target images from the source images at block 350. At this time, at least one target image may be extracted from one source image. As shown in the example of FIG. 5D, multiple target images 541 and 542, each having one object, are extracted from one source image 540. As shown in the example of FIG. 5E, one target image 551 may be extracted from one source image 550. At this time, the target image may have a plurality of objects 551A and 551B. The target image extraction procedure is described with reference to FIG. 6.

Figure 5F:
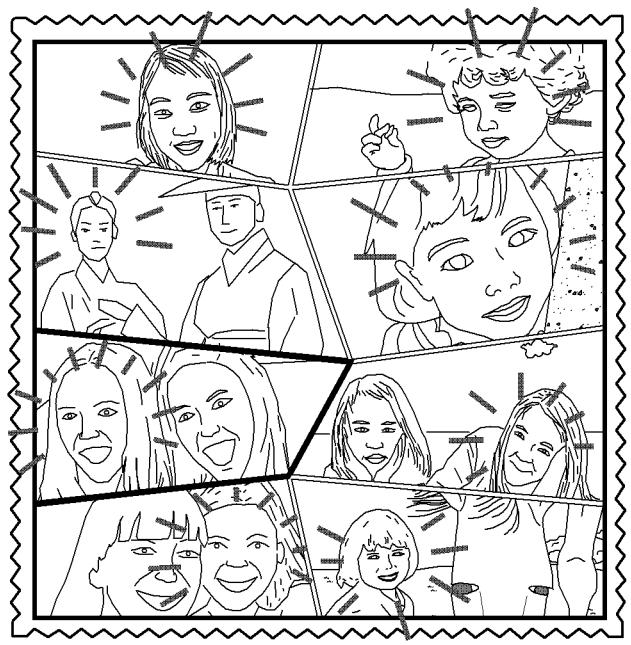
FIG. 5F is a diagram illustrating an example screen display for explaining a procedure of mapping the target images to the sections of the frame in the image synthesis method of claim 3.

The control unit 280 may control the display unit 210 to display each target image in the section mapped to each section at block 360. As shown in FIG. 5F, the target images having objects are displayed in the corresponding sections. The control unit 280 may display the target images in response to a touch gesture. For example, if a pinch-in gesture is detected on one of the sections, the control unit 280 may reduce the size of the image in the corresponding section. If a pinch-out gesture is detected, the control unit 280 may enlarge the image in the corresponding section. If a drag gesture is detected, the control unit 280 may change the position of the object. If a double tap is detected, the control unit 280 may flip the image in the corresponding section horizontally. If a touch and a rotation gesture of a touch input tool are detected consecutively, the control unit 280 may rotate the image in the corresponding section.

The control unit 280 may store the frame composed of the section presenting the target images as a synthesis image at operation 370.

As described above, the image synthesis may be performed after selecting the source images. Also, the images tagged to the source image may be selected. Referring to FIG. 4, if one of the thumbnail images is selected and then at tap gesture is detected on tag option button 430, the control unit 280 may control the display unit 210 to display the thumbnail images of the images tagged to the source image. Afterward, the control unit 280 may select some or all of the thumbnail images selected and synthesize the tagged images with the previously selected source images, resulting in a display of the synthesis image.

Figure 6:
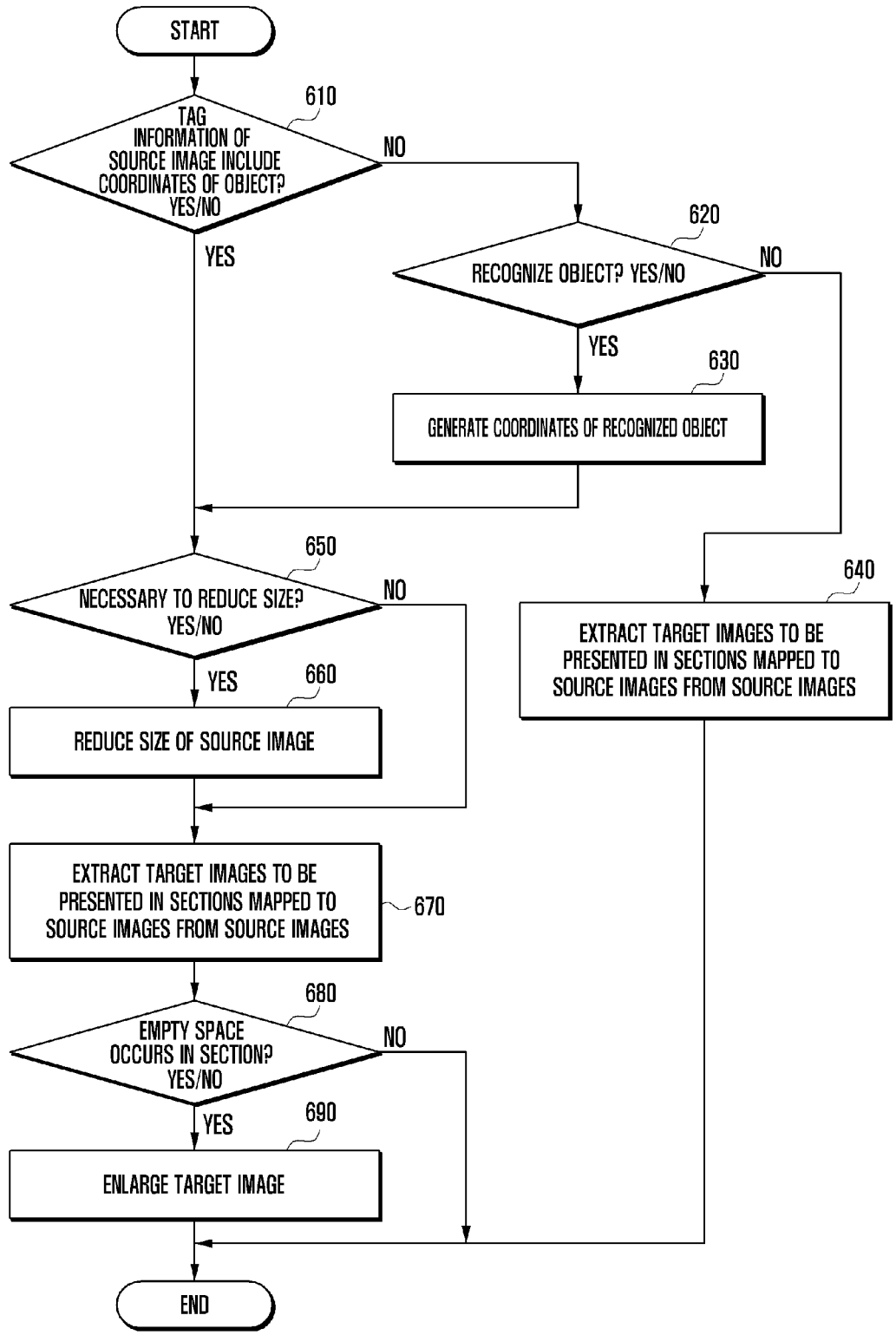
FIG. 6 is a flowchart illustrating an example procedure of extracting target images from the source image in the image synthesis method in accordance with aspects of the present disclosure.

FIG. 6 is a flowchart illustrating an example procedure of extracting target images from the source image in the image synthesis method in accordance with aspects of the present disclosure. The actions shown in FIG. 7 thru 10C will be discussed with reference to FIG. 6

Referring to FIG. 6, the control unit 280 may determine whether the tag information of the source image includes object coordinates at block 610. If the object coordinates are included, the procedure may go to block 650.

If no coordinates are included in the tag information, the control unit 280 may perform object recognition on the source image at block 620. If any object is recognized, the control unit 280 may generate the coordinates (e.g. coordinates of the top left and bottom right corners of the rectangle surrounding the corresponding object) on the recognized object and tag the position information to the source image at block 630.

If recognition of the object fails, the control unit 280 may extract a random target image to be presented in the section mapped to the source image at block 640. At this time, since the object recognition has failed, the target image may not include the object or may include a part of the object (e.g. face).

Figure 7:
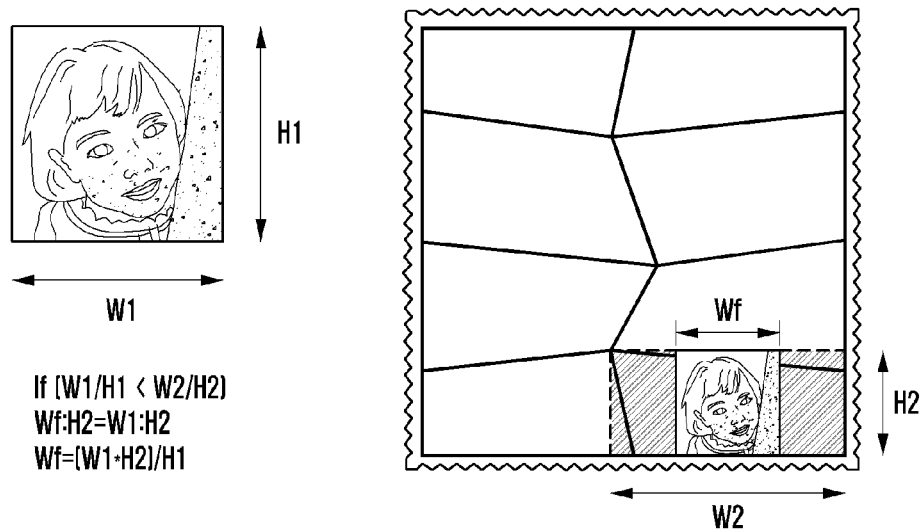
FIG. 7 and FIG. 8 are diagrams illustrating example operations of shrinking the target image to fit for the corresponding section in the image synthesis method in accordance with aspects of the present disclosure.
Figure 8:
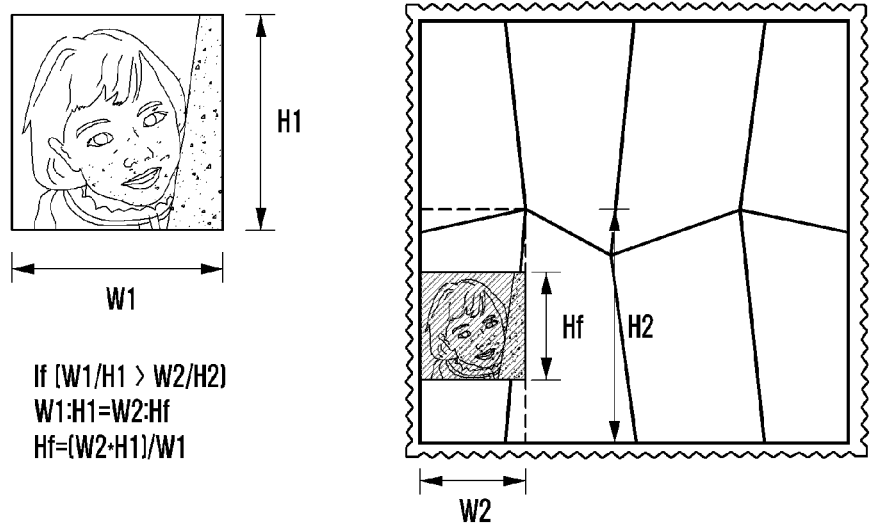

The control unit 280 may determine whether it is necessary to reduce the size of the source image at block 650. Referring now to FIGS. 7-8, if it is not necessary to reduce the size, e.g., if the height H1 of the object is less than the height H2 of the section and if the width W1 of the object is less than the width W2 of the section, the procedure may move one to block 670.

If H1>H2 or W1>W2, the control unit 280 may reduce the size of the original image using the following method at block 660. Referring to FIG. 7, if W1/H1<W2/H2, the control unit 280 may reduce the size of the source image such that the W1 becomes Wf (=(W1*H2)/H1). Referring to FIG. 8, if W1/H1>W2/H2, the control unit 280 may reduce the size of the source image such that H1 becomes Hf (=(W2*H1)/W1).

The control unit 280 may extract the target image to be presented in the section mapped to the source image from the source image at block 670. Here, the target image may include at least one object. The image extraction may be performed as follows.

Figure 9A:
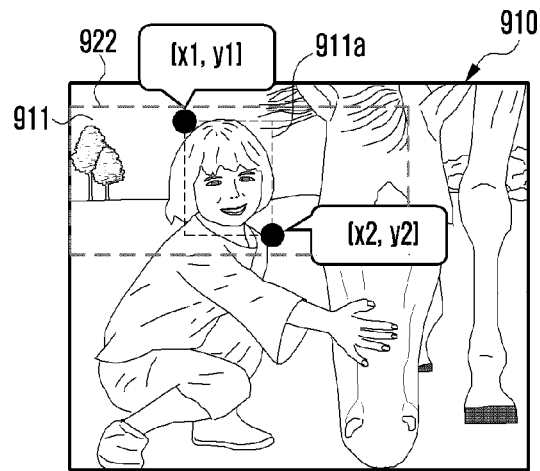
FIG. 9A and FIG. 9B are diagrams illustrating example screen displays for explaining the operation of calculating the target image area in the image synthesis method in accordance with aspects of the present disclosure.
Figure 9B:
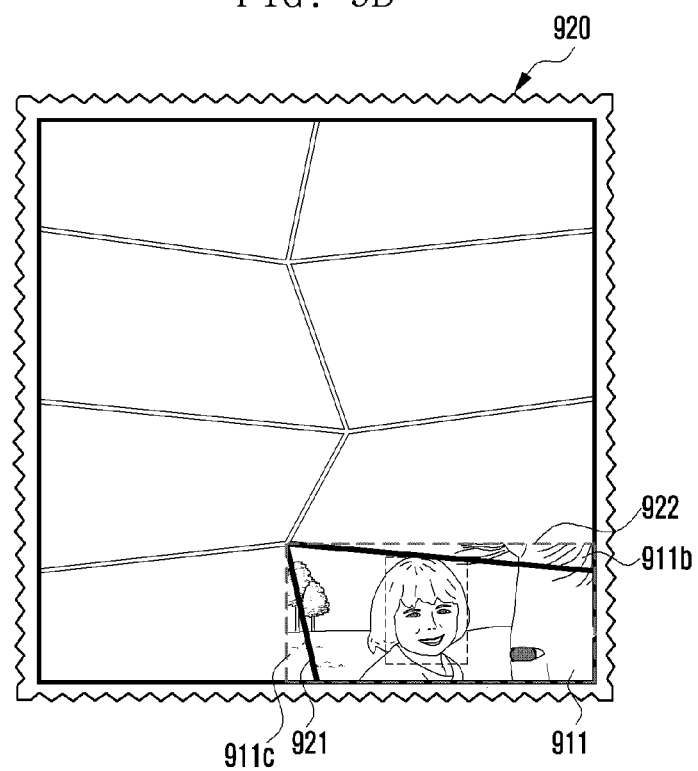

Referring to FIGS. 9A and 9B, the source image 910 may be mapped to the first section 921 of the frame 920. The shape of the first section 921 may be non-rectangular or non-quadrangular (i.e. having at least one non-right angle) as shown in the drawing. The source image in this example includes a face object 911A, and the corresponding tag information includes the position information (x1, y1) and (x2, y2) of the face object 911A. The height of the face object 911A is less than the height of the first section 921, and the width of the face object 911A is less than the width of the first section 921. Accordingly, in this example, it is not necessary to reduce the size of the face object 911A.

Assuming size reduction is not needed, the control unit 280 may generate a rectangle or quadrangle 922 greater in size than the first section 921. If the shape of the first section 921 is rectangular, this operation may not be necessary. The control unit 280 may place the rectangle 922 on the source image 910 such that the face object 911A is centered in the rectangle 922. The control unit 280 may extract the target image 911 surrounded by the rectangle 922 from the source image. Next, the control unit 280 may match the center of the target image 911 to the center of the first section 921 and may hide or delete the parts 911B and 911C out of the first section 921.

In another example, the object may deviate from the source image. If the above-described extraction method is applied to an object deviating from the source image, the corresponding section may not be filled fully with the image. That is, the control unit 280 may determine whether the extracted image may cause an empty space in the corresponding section at block 680. If it causes an empty space, the control unit 280 may enlarge the target image to fill out the empty space at block 690. The image enlargement may be performed as follows.

Figure 10A:
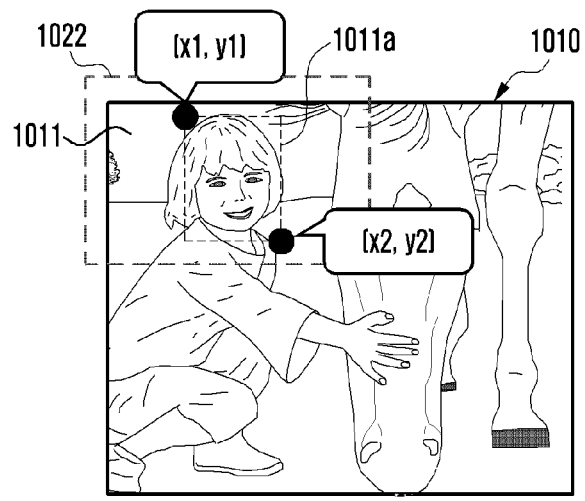
FIG. 10A, FIG. 10B and FIG. 10C are diagrams illustrating example screen displays for explaining the operation of enlarging the target image to fit for the corresponding section in the image synthesis method in accordance with aspects of the present disclosure.
Figure 10B:
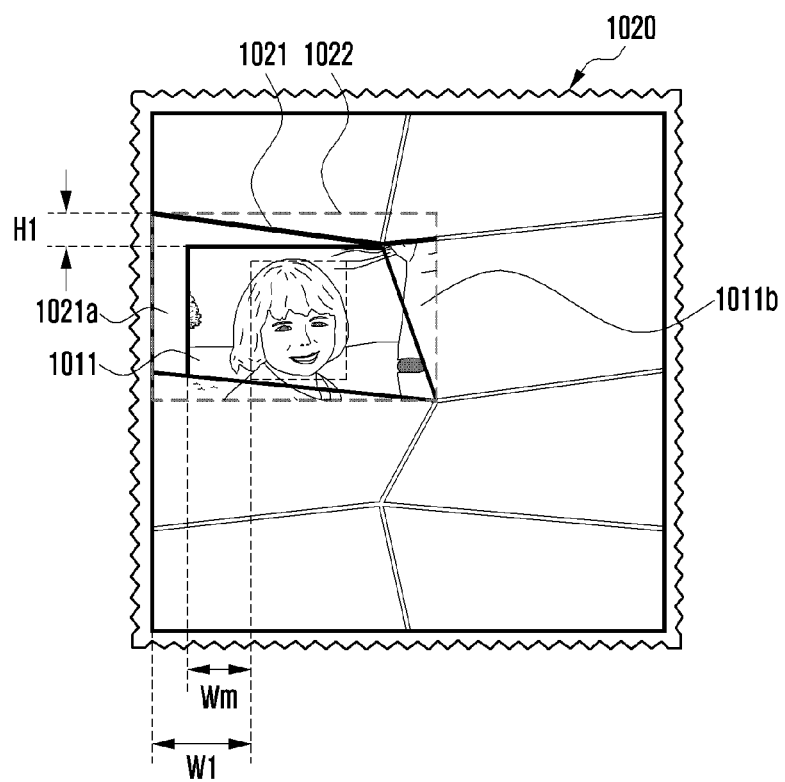
Figure 10C:
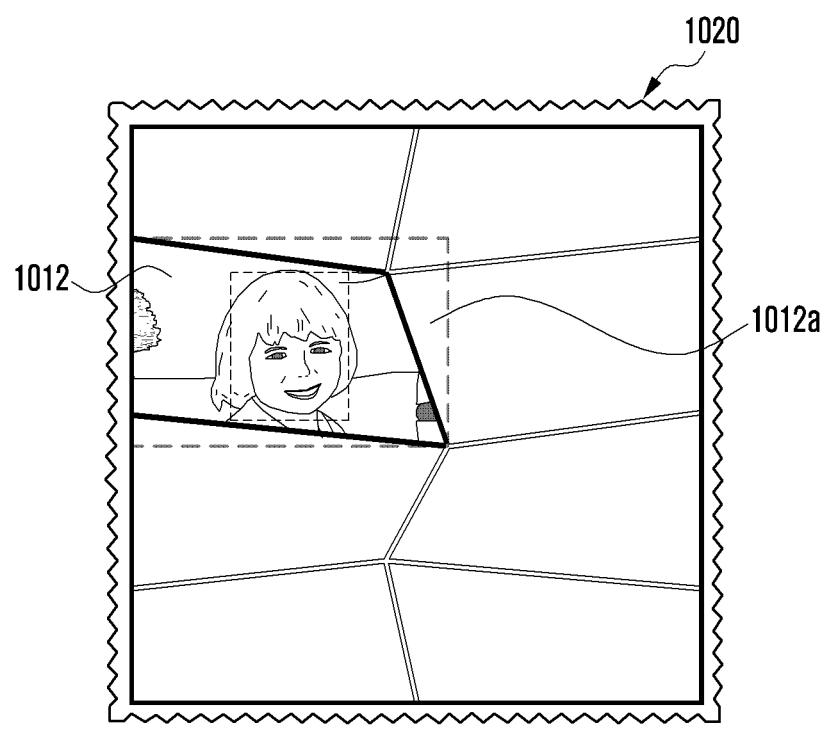

Referring to FIGS. 10A to 10C, the source image 1010 in this example is mapped to the first section 1021 of the frame 1020. The shape of the first section 1021 is a quadrangle. The source image 1010 may include the face object 1011A, and the corresponding tag information may include the position information (x1, y1) and (x2, y2) of the face object 1011A. The height of the face object 1011A in this example is less than the height of the first section 1021, and the width of the object 1011A in this example is less than the width of the first section 1021. Accordingly, there is no need to reduce the size of the face object 1011A in this example.

Assuming size reduction is not needed, the control unit 280 may generate a rectangle 1022 surrounding the first section 1021. If the shape of the first section is a non-rectangular quadrangle, this operation may be omitted. The control unit 280 may place the rectangle 1022 on the source image such that the face object 1011A is positioned at the center of the rectangle 1022. The control unit 280 may also extract the target image 1011 in the rectangle 1022 from the source image. The control unit 280 may further match the center of target image 1011 to the center of the first section 1021 and delete the part 1011B deviating from the first section 1021. As shown in the example of FIG. 10B, the first section 1021 has the empty space 1021A with a width (W1-Wm) and a height H. If such an empty space 1021A occurs, the control unit 280 may enlarge the target image 1011 to fill out the first section 1021. The control unit 280 may hide or delete the part 1012a of the enlarged target image 1012 that deviates from the first section 1021, as shown in FIG. 10C.

In a further example, the images stored in mobile terminal 200 may be managed in a folder. The term 'folder' may be interchangeably used with the term 'group'. The name of the folder may be given by the user. The mobile terminal 200 may generate a cover of the folder, i.e. a magazine view representing the images. The magazine view may be generated by combining the sub-images into one synthesis image. Accordingly, the user may be aware of the images intuitively by means of the magazine view. For example, the user may recognize the theme grouping the images under the magazine view intuitively. The magazine view may be referred to as frame, tile view, or cover.

The display unit 210 may display the magazine view under the control of the control unit 280. If the magazine view is selected (tapped) by the user, the control unit 280 may control the display unit 210 to display the sub-images in the form of thumbnail images.

The user may move the images from one folder to another. The user may delete a certain image from the folder. The user may add a certain image to the folder. Naturally, the update of the image folder such as move, delete, and add may be performed automatically (i.e. without user input). For example, if an image is taken, the control unit 280 may add the image to the folder related to the corresponding tag information (e.g. shot place). If such an update occurs, the magazine view may also be updated. The update procedure is described with reference to FIGS. 11 to 14.

Figure 11:
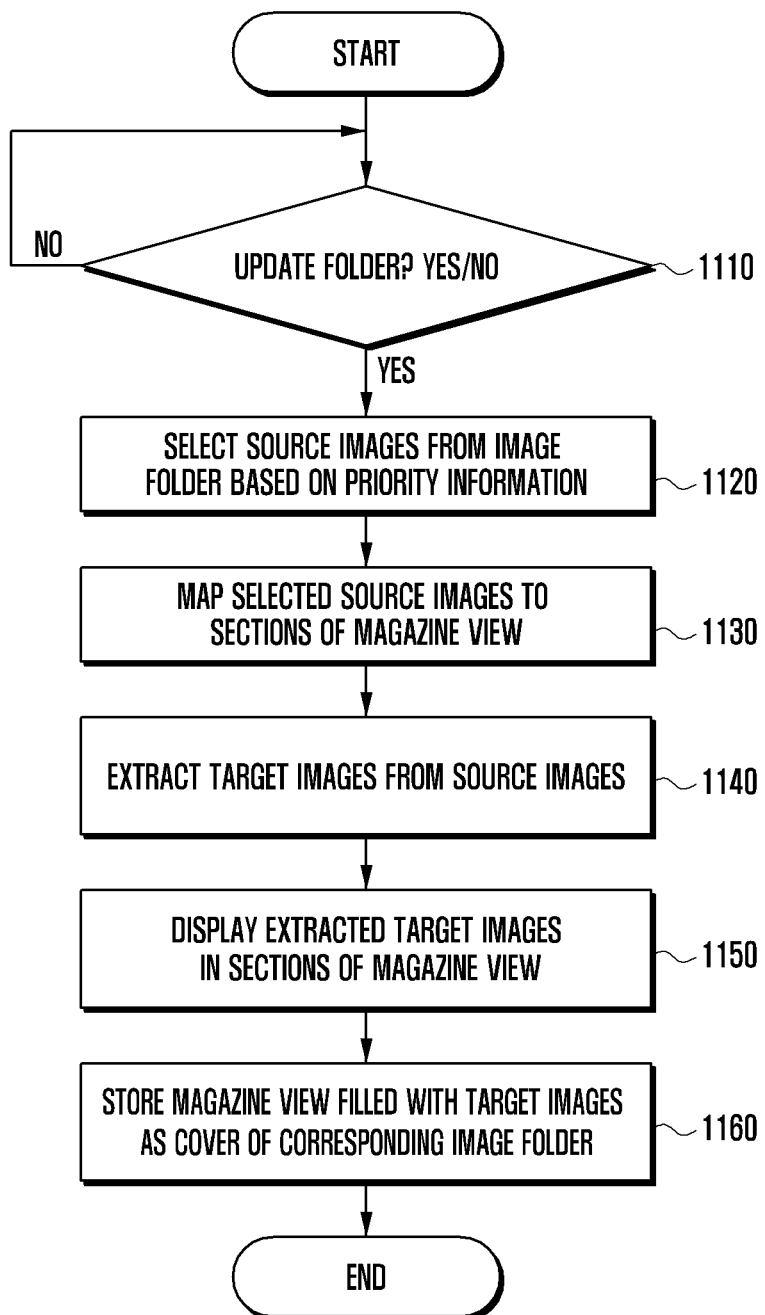
FIG. 11 is a flowchart illustrating an example image synthesis method according to another example of the present disclosure.
Figure 12:
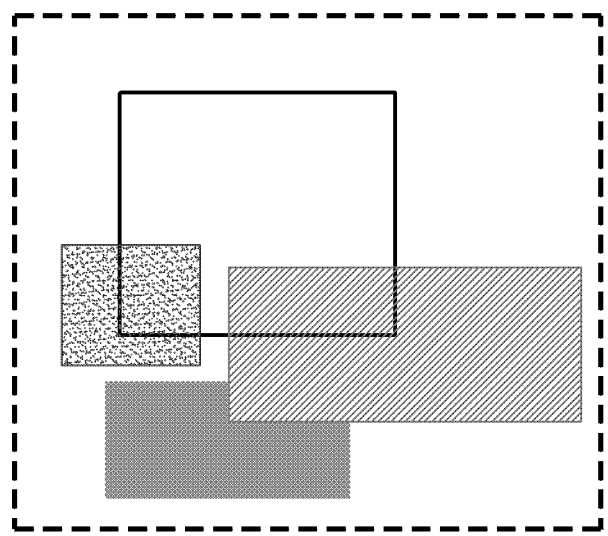
FIG. 12 is a diagram illustrating an example magazine view for use in the image synthesis method in accordance with aspects of the present disclosure.

FIG. 11 is a flowchart illustrating an image synthesis method according to another aspect of the present disclosure. FIG. 12 is a diagram illustrating a magazine view for use in the image synthesis method.

Referring to FIG. 11, the control unit 280 determines whether the image folder has been updated at block 1110. At block 1120, if the image folder has been updated, the control unit 280 selects the source images from the image folder based on the priority summarized in table 1.

The control unit 280 may map the selected source images to the sections of the magazine view one by one at block 1130. As shown in FIG. 12, the sections of the magazine view may be overlapped as shown in FIG. 12. Of course, the sections of the magazine view may also not be overlapped as shown in FIG. 5. The source images or the objects may be mapped to the sections in various ways. For example, the control unit 280 may perform the mapping randomly. The control unit 280 also may perform the mapping in an order according to the size of the object. That is, the mapping may be performed in a descending object size order.

The control unit 280 extracts target images from the corresponding source images at block 1140. Here, one or more target images may be extracted from one source image. One target image may include a plurality of objects. The target image may include one object. The target image extraction procedure is described with reference to FIG. 13.

The control unit 280 controls the display unit 210 to display the target images in the sections mapped to the corresponding source images at block 1150.

The control unit 280 may store the magazine view the sections of which may be filled with the target images as a cover of the corresponding image folder at block 1160.

Figure 13:
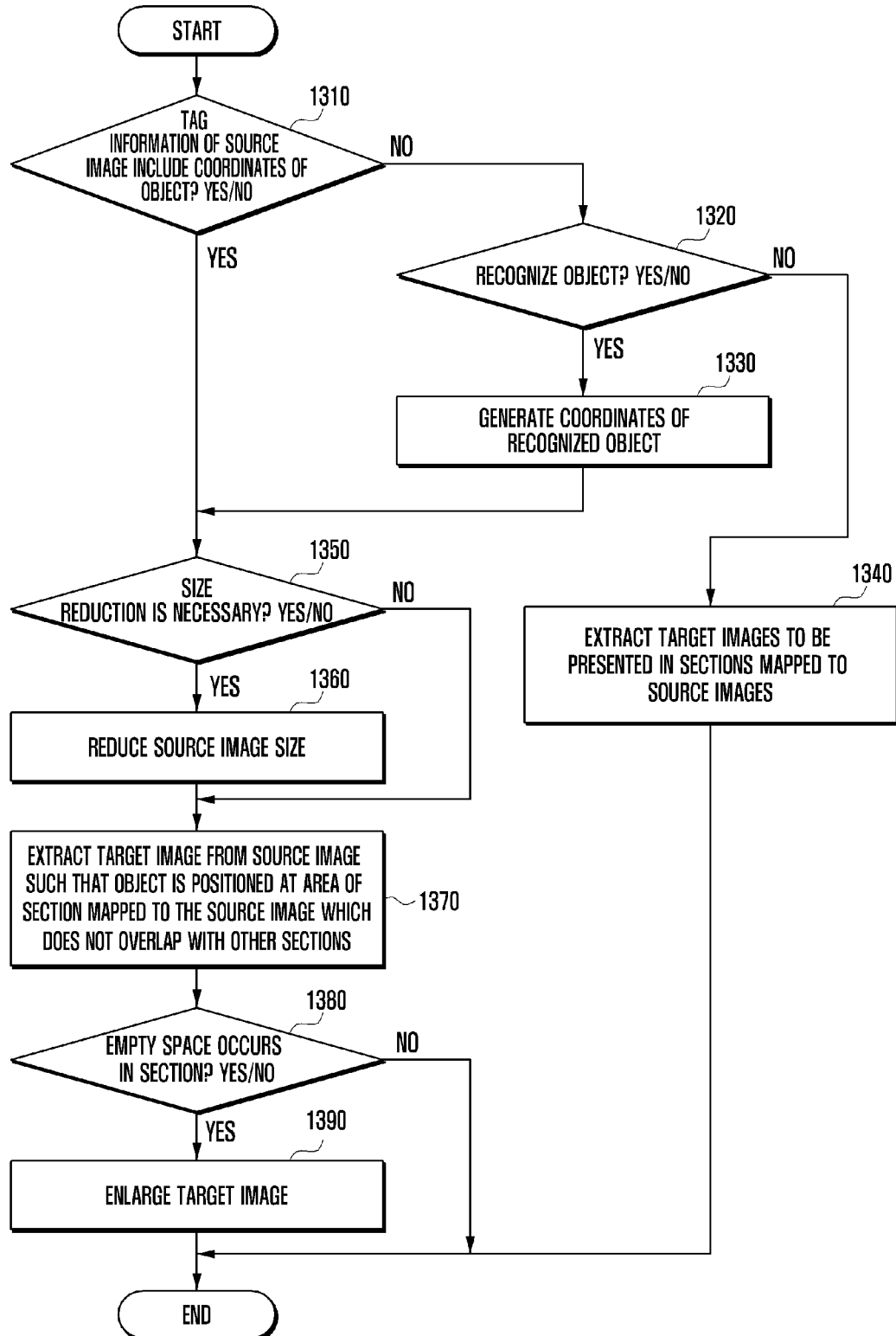
FIG. 13 is a flowchart illustrating an example procedure of extracting target images from the source image in the image synthesis method in accordance with aspects of the present disclosure.
Figure 14A:
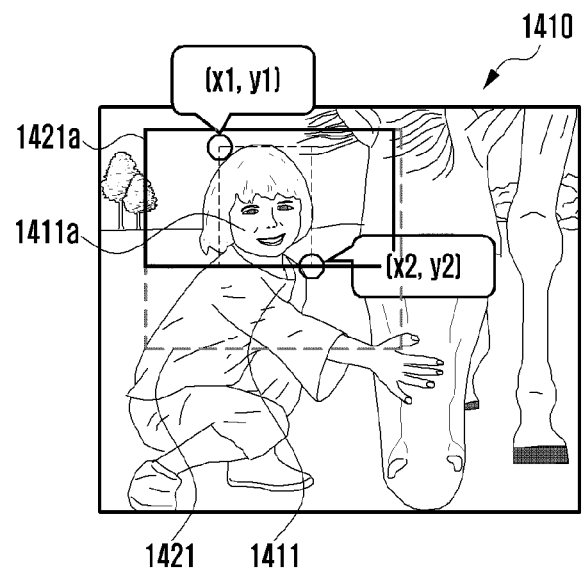
FIG. 14A, FIG. 14B and FIG. 14C are diagram illustrating example frames for explaining a target image area calculation procedure in the image synthesis method in accordance with aspects of the present disclosure.
Figure 14B:
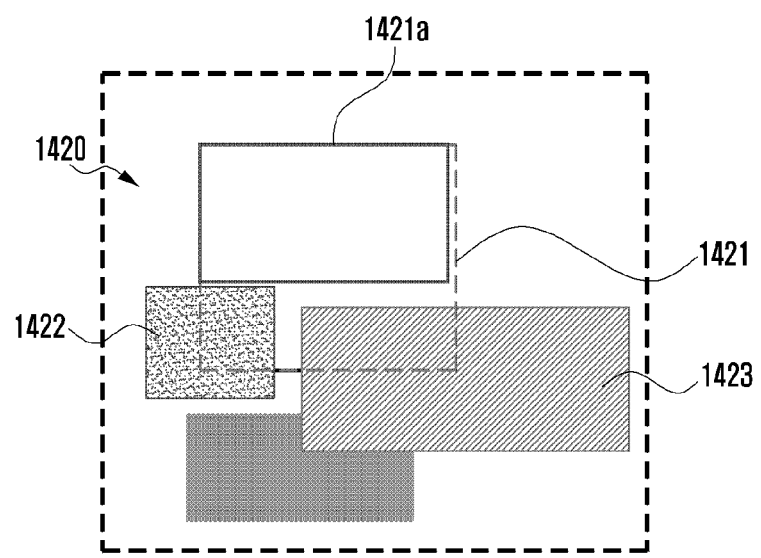
Figure 14C:
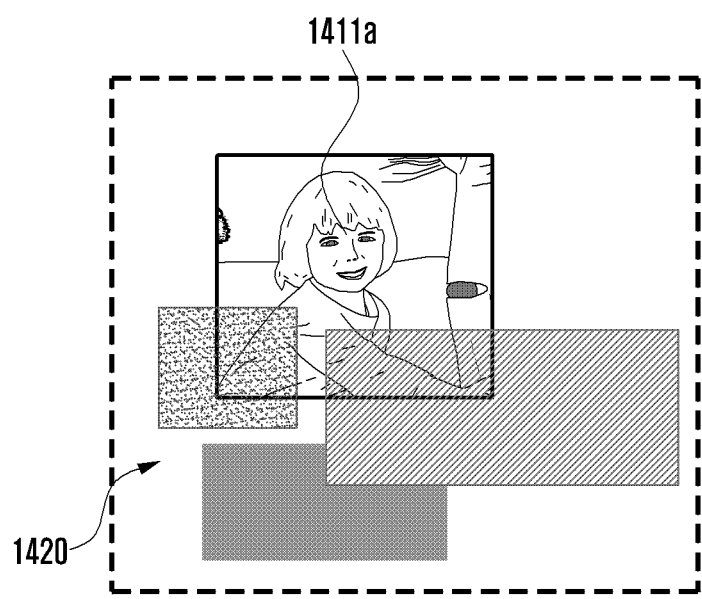

FIG. 13 is a flowchart illustrating an example procedure of extracting target images from the source image in the image synthesis method in accordance with aspects of the present disclosure. FIGS. 14A to 14C are diagrams illustrating example frames for explaining a target image area calculation procedure in the image synthesis method.

Referring to FIG. 13, the control unit 280 may determine whether the tag information of the source image includes any object coordinates at block 1310. If the tag information includes the object coordinates, the procedure may go to block 1350.

If the tag information does not include coordinates, the control unit 280 may performs object recognition or detection on the source image at block 1320. If any object is recognized, the control unit 280 may generate coordinates associated with the recognized object at block 1330 and may tag the object position information to the source image. After tagging the object position information, the procedure may go to block 1350.

If no object is recognized, the control unit 280 may extract a random target image to be presented in the section mapped to the source image at block 1340.

The control unit 280 may determine whether it is necessary to reduce the size of the source image at block 1350. If it is not necessary to reduce the size of the source image, the procedure may go to block 1370. If it is necessary to reduce the size of the source image, the control unit 280 may reduce the size at block 1360. After reducing the size, the procedure may go to block 1370.

At block 1370, the control unit 280 may extract the target image from the source image such that the object is placed at an area of the section mapped to the source image that does not overlap with other sections. The image may be extracted as follows.

Referring to FIGS. 14A to 14C, the source image 1410 in this example is mapped to the first section 1421 of the magazine view 1420. The first section 1421 has a shape of rectangle, the second section 1422 overlaps part of the section 1421, and a third section 1423 overlaps another part. The source image 1410 includes the face object 1411A, and the corresponding tag information includes the positions (x1, y1) and (x2, y2) of the face object 1411A. In this example, the height of the face object 1411A is greater than the height of the first section 1421, and the width of the object 1411A is less than the width of the first section 1421. Accordingly, in this example, it is not necessary to reduce the size of the face object 1411A.

Assuming size reduction is not needed, the control unit 280 may determine whether the shape of the first section 1421 is rectangular. If the shape of the first section 1421 is rectangular, the control unit 280 may determine whether another section overlaps the first section 1421. If another section overlaps any part as shown in the drawing, the control unit 280 may check the area 1421A, which does not overlap with other sections. The control unit 280 may place the face object 1411A at the center of the non-overlapped area 1421A. Next, the control unit 280 may place the first section 1421 on the source image 1410 based on the non-overlapped area 1421A. Next, the control unit 280 may extract the target image 1411 delimited by the first section 1421 from the source image 1410. Next, the control unit 280 may place the target image 1411 in the first section 1421 of the magazine view 1420. In this example, the magazine view 1420 may be displayed as shown in FIG. 14C as a result. In FIG. 14C, other sections do not overlap the face object 1411A.

At block 1380, once the image has been extracted, the control unit 280 may determine whether there is any empty space. If there is empty space, the control unit 280 may enlarge the target image to fill out the section without empty space at block 1390.

Figure 15A:
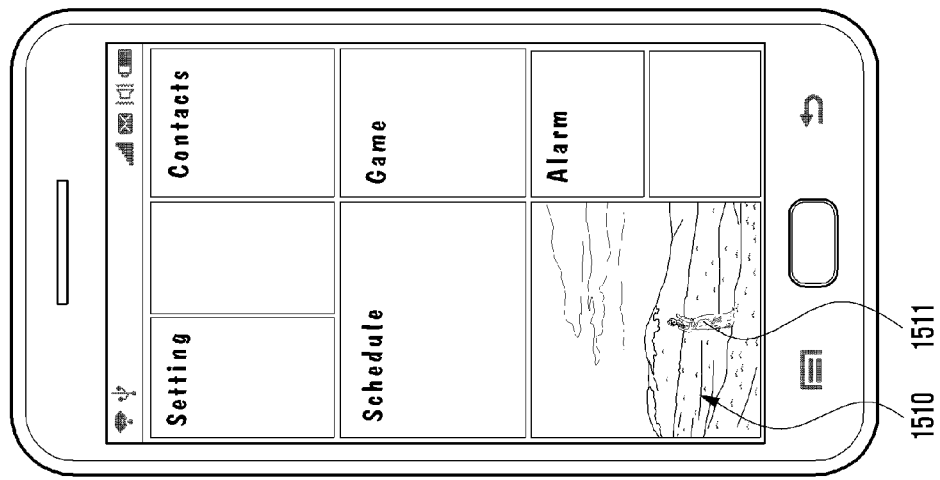
FIG. 15A, FIG. 15B and FIG. 15C are diagrams illustrating example screen displays for explaining tile views for use in the image synthesis method in accordance with aspects of the present disclosure.
Figure 15B:
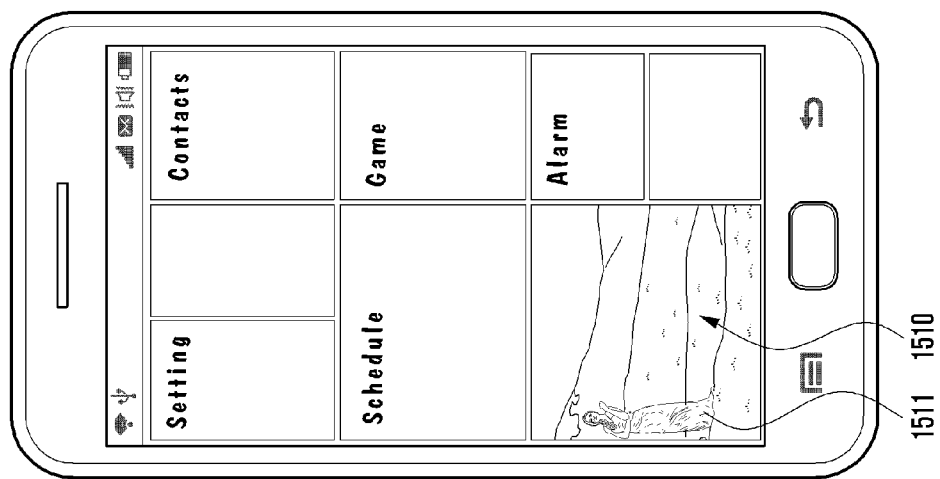
Figure 15C:
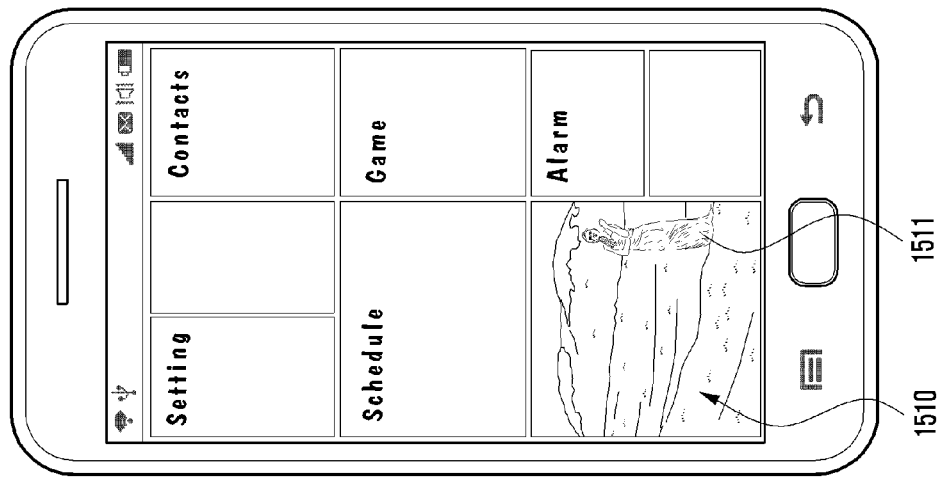

FIGS. 15A to 15C are diagrams illustrating example screen displays for explaining tile views for use in the image synthesis method in accordance with aspects of the present disclosure.

Referring to FIGS. 15A to 15C, a home screen may be displayed in the form of a tile view. The tile view may include tiles (i.e. items) representing settings, contacts, schedule, game, alarm, gallery, Social Network Service (SNS), etc. For example, the setting tile may include frequently used setting items (e.g. Wi-Fi on/off). The contact tile may present favorite contact information. The gallery tile may present the recently-taken photo. The user may check the content (e.g. photo, contact, and SNS message) of the application represented by corresponding time in the tile view.

The control unit 280 may access the tag information of a photo to check the position of the object 1511 and ensure that the corresponding photo is displayed in the gallery tile without missing the object 1511. At this time, the control unit 280 may control the display unit 210 to provide a motion visual effect. For example, referring to FIGS. 15A and 15B, the target image may be presented on the corresponding tile with a visual effect in which the object 1511 moves from left to right. This motion effect may be implemented in such that the image moves but the object does not move. The visual effect may be referred to as visual feedback or animation.

The control unit 280 may control the display unit 210 to provide a visual effect in which the object 1511 is zooming. Referring to FIGS. 15B and 15C, a zoom-out visual effect may be applied such that the object is reduced in size. Through the zoom-out effect, the space occupied by the background increases. In the case that the zoom-in visual effect is applied, the space occupied by the background decreases.

As described above, the image synthesis method and device of the present disclosure is capable of accurately positioning an object to the desired section of a frame.

The above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for".

In addition, an artisan understands and appreciates that a "processor" or "microprocessor" constitute hardware in the claimed invention. Under the broadest reasonable interpretation, the appended claims constitute statutory subject matter in compliance with 35 U.S.C. §101.

The functions and process steps herein may be performed automatically or wholly or partially in response to user command. An activity (including a step) performed automatically is performed in response to executable instruction or device operation without user direct initiation of the activity.

The terms "unit" or "module" referred to herein is to be understood as comprising hardware such as a processor or microprocessor configured for a certain desired functionality, or a non-transitory medium comprising machine executable code, in accordance with statutory subject matter under 35 U.S.C. §101 and does not constitute software per se.

What is claimed is:

1. An image synthesis method comprising:
   detecting, by an electronic device, selection of source images;
   recognizing a number of objects in the selected source images;
   displaying thumbnail images representing respectively frames on a display of the electronic device, each of the frames having sections and the number of the sections being equal to the number of the objects;
   detecting, by the electronic device, a user input selecting one of the thumbnail images representing frames having the number of sections being equal to the number of objects;
   acquiring position information of the objects in tag information associated with the source images;
   extracting target images from the source images based on the position information such that each of the extracted target images contains an object; and
   displaying, on the display of the electronic device, the target images in the sections of the frame that correspond to the selected one of the thumbnail images.

2. The image synthesis method of claim 1, wherein extracting the target images comprises extracting the target images such that each of the objects is centered in each of the sections.

3. The image synthesis method of claim 2, wherein extracting the target images comprises:
   generating a rectangle surrounding a section which is not rectangular;
   placing the rectangle on a source image such that an object is centered in the rectangle;
   extracting a target image delimited by the rectangle from the source image;
   matching a center of the extracted target image to a center of the section; and
   deleting a part of the image that deviates from the section.

4. The image synthesis method of claim 1, wherein extracting the target images comprises:
   reducing a size of a source image, when a width of an object in the source image is greater than that of a section mapped to the object or a height of the object is greater than that of the mapped section; and
   extracting a target image from the reduced source image.

5. The image synthesis method of claim 1, wherein the displaying of the target images comprises:
   enlarging a target image, when the target image is smaller than a section mapped to the target image; and
   displaying the enlarged target image.

6. The image synthesis method of claim 1, wherein extracting the target images comprises extracting a target image such that an object included in the target image does not overlap with a different section, when it is determined that a section mapped to the object overlaps with the different section.

7. The image synthesis method of claim 1, further comprising providing at least one of the target images with a moving visual effect.

8. The image synthesis method of claim 1, further comprising providing at least one of the target images with a zooming visual effect.

9. An image synthesis method comprising:
   detecting, by an electronic device, selection of source images included in an image folder;
   recognizing a number of objects in the source images;
   displaying thumbnail images representing respectively frames on a display of the electronic device, each of the frames having sections and the number of the sections being equal to the number of the objects;
   detecting, by the electronic device, a user input selecting one of the thumbnail images representing frames having the number of sections being equal to the number of objects;
   acquiring position information of the objects in tag information associated with the source images;
   extracting target images from the source images based on the position information, such that each of the extracted target images contains an object; and
   displaying, on the display of the electronic device, each target image in a corresponding section of a magazine screen view representing a cover of the image folder.

10. The image synthesis method of claim 9, wherein selecting the source images comprises:
    detecting identity information tagged to each image in the image folder; and
    selecting an image associated with a title of the image folder as a source image, when selecting the image associated with the title is a highest priority.

11. The image synthesis method of claim 9, wherein selecting the source images comprises:
    detecting date information associated with each image in the image folder; and
    selecting an image having a recent tagging date as a source image, when selecting the image having the recent tagging date is a highest priority.

12. The image synthesis method of claim 9, wherein the tag information comprises at least one of identity information, date information, contrast information, position information, and resolution information; and selecting of the source images comprises selecting the source images using at least one of the identity information, date information, contrast information, position information, and resolution information.

13. An electronic device comprising:
    a display unit;
    a touch panel mounted on a screen of the display unit;
    a storage unit which stores images and tag information associated with the images;
    a control unit configured to:
    detect selection of source images on the touch panel;
    recognize a number of objects in the selected source images;
    display thumbnail images representing respectively frames on the display unit, each of the frames having sections and the number of the sections being equal to the number of the objects;
    detect a user input selecting one of the thumbnail images on the touch panel representing frames having the number of sections being equal to the number of objects;
    acquire position information of the objects in tag information associated with the source images;
    extract target images from the source images based on the position information such that each of the extracted target images contains an object; and display the target images in the sections of the frame that correspond to the selected one of the thumbnail images.

14. The electronic device of claim 13, wherein the control unit further configured to extract the target images such that each of the objects is centered in each of the sections.

15. The electronic device of claim 14, wherein the control unit further configured to:
generate a rectangle surrounding a section which is not rectangular;
place the rectangle on a source image such that an object is centered in the rectangle;
extract a target image delimited by the rectangle from the source image;
match a center of the extracted target image to a center of the section; and
delete a part of the image that deviates from the section.

16. The electronic device of claim 13, wherein the control unit further to:
reduce a size of a source image, when a width of an object in the source image is greater than that of a section mapped to the object or a height of the object is greater than that of the mapped section; and
extract a target image from the reduced size source image.

17. The electronic device of claim 13, wherein the control unit further to:
enlarge a target image, when the target image is smaller than a section mapped to the target image; and
display the enlarged target image on the display unit.

18. The electronic device of claim 13, wherein the control unit to further extract a target image such that an object included in the target image does not overlap with a different section, when it is determined that a section mapped to the object overlaps with the different section.

19. The electronic device of claim 13, wherein the control unit to further provide at least one of the target images with a moving visual effect on the display unit.

20. The electronic device of claim 13, wherein the control unit to further provide at least one of the target images with a zooming visual effect on the display unit.

21. An electronic device comprising:
a display unit;
a storage unit to store images and tag information tagged to the images;
a control unit configured to:
detect selection of source images included in an image folder;
recognize a number of objects in the source images;
display thumbnail images representing respectively frames on the display unit, each of the frames having sections and the number of the sections being equal to the number of the objects;
detect a user input selecting one of the thumbnail images representing frames having the number of sections being equal to the number of objects;
acquire position information of the objects in tag information associated with the source images;
extract target images from the source images based on the position information, such that each of the extracted target images contains an object; and
display each target image in a corresponding section of a magazine screen view representing a cover of the image folder.

22. The electronic device of claim 21, wherein the control unit to further:
detect identity information tagged to each image in the image folder; and
select an image associated with a title of the image folder as a source image, when selecting the image associated with the title is a highest priority.

23. The electronic device of claim 21, wherein the control unit to further:
detect date information associated with each image in the image folder; and
select an image having a recent tagging date as a source image, when selecting the image having the recent tagging date is a highest priority.

24. The electronic device of claim 21, wherein the tag information comprises at least one of identity information, date information, contrast information, position information, and resolution information; and the control unit to further select the source images using at least one of the identity information, date information, contrast information, position information, and resolution information.

* * * * *